US008489722B2

(12) United States Patent
Karenos et al.

(10) Patent No.: US 8,489,722 B2
(45) Date of Patent: Jul. 16, 2013

(54) SYSTEM AND METHOD FOR PROVIDING QUALITY OF SERVICE IN WIDE AREA MESSAGING FABRIC

(75) Inventors: Kyriakos Karenos, New York, NY (US); Minkyong Kim, Scarsdale, NY (US); Hui Lei, Scarsdale, NY (US); Dimitrios Pendarakis, Westport, CT (US); Hao Yang, Montrose, NY (US); Fan Ye, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 12/625,437

(22) Filed: Nov. 24, 2009

(65) Prior Publication Data
US 2011/0125921 A1 May 26, 2011

(51) Int. Cl.
G06F 15/173 (2006.01)
H04L 12/56 (2006.01)

(52) U.S. Cl.
USPC .......................................... 709/223; 370/401

(58) Field of Classification Search
USPC ........................ 370/401, 351; 709/223–224
See application file for complete search history.

(56) References Cited

U.S. PATENT DOCUMENTS

| 5,995,503 | A | * | 11/1999 | Crawley et al. | 370/351 |
| 6,349,325 | B1 | | 2/2002 | Newcombe et al. | 709/202 |
| 6,813,272 | B1 | * | 11/2004 | An et al. | 370/395.21 |
| 7,406,537 | B2 | * | 7/2008 | Cullen | 709/238 |
| 7,489,653 | B2 | * | 2/2009 | Zhang et al. | 370/328 |
| 7,499,404 | B2 | * | 3/2009 | Ravindran et al. | 370/238 |
| 7,529,263 | B1 | * | 5/2009 | Sparrell et al. | 370/437 |
| 7,725,590 | B2 | * | 5/2010 | Sedukhin | 709/230 |
| 2002/0087699 | A1 | * | 7/2002 | Karagiannis et al. | 709/227 |
| 2002/0097463 | A1 | * | 7/2002 | Saunders et al. | 359/124 |
| 2002/0181395 | A1 | * | 12/2002 | Foster et al. | 370/229 |
| 2003/0115317 | A1 | * | 6/2003 | Hickson et al. | 709/224 |
| 2003/0135556 | A1 | * | 7/2003 | Holdsworth | 709/206 |
| 2003/0202468 | A1 | * | 10/2003 | Cain et al. | 370/229 |
| 2004/0006613 | A1 | * | 1/2004 | Lemieux et al. | 709/223 |

(Continued)

FOREIGN PATENT DOCUMENTS
WO    WO 2009/019671    2/2009

OTHER PUBLICATIONS

Mahambre, S.P., et al.., "Reliable Routing of Event Notifications over P2P Overlay Routing Substrate in Event Based Middleware," appearing in Parallel and Distributed Processing Symposium 2007, IPDPS 2007, IEEE International, Mar. 26-30, 2007, pp. 1-8.

(Continued)

Primary Examiner — Firmin Backer
Assistant Examiner — Michael A Chambers
(74) Attorney, Agent, or Firm — Ido Tuchman; Preston J. Young

(57) ABSTRACT

Techniques for transmitting data according to at least one quality of service requirement. A message path is calculated specifying a sequence of broker computers selected from a network of interconnected broker computers. The message path is statistically estimated to fulfill the at least one quality of service requirement. Quality of service metrics are received about the network of interconnected broker computers. If the message path is determined not to fulfill the quality of service requirement, a new message path is calculated specifying a new sequence of broker computers selected from the network of interconnected broker computers. The new message path is statistically estimated to fulfill the at least one quality of service requirement.

25 Claims, 11 Drawing Sheets

U.S. PATENT DOCUMENTS

| | | | |
|---|---|---|---|
| 2004/0073701 A1 | 4/2004 | Huang et al. | 709/240 |
| 2004/0139088 A1 | 7/2004 | Mandato et al. | 707/100 |
| 2004/0153545 A1* | 8/2004 | Pandya et al. | 709/226 |
| 2005/0122902 A1* | 6/2005 | Guo et al. | 370/229 |
| 2006/0167968 A1* | 7/2006 | Reynolds et al. | 709/202 |
| 2006/0168331 A1 | 7/2006 | Thompson et al. | 709/238 |
| 2006/0233166 A1* | 10/2006 | Bou-Diab et al. | 370/389 |
| 2007/0183421 A1* | 8/2007 | Terrell et al. | 370/389 |
| 2007/0211632 A1* | 9/2007 | Song et al. | 370/230 |
| 2008/0177880 A1 | 7/2008 | Ginis | 709/226 |
| 2009/0016259 A1* | 1/2009 | Zhang et al. | 370/315 |
| 2009/0059937 A1* | 3/2009 | Kanada | 370/401 |
| 2009/0154397 A1* | 6/2009 | Akhtar | 370/328 |
| 2009/0204724 A1* | 8/2009 | Xiao et al. | 709/243 |

OTHER PUBLICATIONS

Mahambre, S.P., et al., "A Taxonomy of QoS-Aware, Adaptive Event-Dissemination Middleware," IEEE Computer Society, Jul.-Aug. 2007, pp. 35-44.

Carvalho et al., "Scalable QoS-Based Event Routing in Publish-Subscribe Systems," Technical Report, TR-05-4, Departamento de Informática, Faculdade de Ciências da Universidade de Lisboa, Portugal, Feb. 2005.

Corsaro, A., et al., "Quality of Service in Publish/Subscribe Middleware," Global Data Management, IOS Press 2006, pp. 1-19.

* cited by examiner

SYSTEM AND METHOD FOR PROVIDING QUALITY OF SERVICE IN WIDE AREA MESSAGING FABRIC

BACKGROUND OF THE INVENTION

1. Field of the Invention

The present invention relates generally to messaging. More specifically, the present invention relates to techniques for providing quality of service (QoS) for the transmission of messages over networks which potentially span a wide geographic area.

2. Description of Background

Quality of Service (QoS) is a requirement, or a set of requirements, imposed on the transfer of data over a computer network. A network which provides quality of service is configured to cause data transfers to be performed according to the requirement or set of requirements. The network may provide an assurance that the quality of service requirements will be enforced. The quality of services (QoS) of the messaging substrate plays a critical role in the overall system performance as perceived by the end users.

Publish/Subscribe messaging is a fundamental mechanism for interconnecting different services and systems in the modern service oriented computing architecture. In the publish/subscribe paradigm, publishers transmit messages to subscribers. Each message may be associated with a specific topic. A subscriber may subscribe to a topic in order to receive messages transmitted by publishers on that topic. An arbitrary number of subscribers may subscribe to the same topic. It is noted that publish/subscribe is commonly abbreviated as "pub/sub".

SUMMARY OF THE INVENTION

One aspect of the invention is a method for transmitting data according to at least one quality of service requirement. The method includes calculating a message path specifying a sequence of broker computers selected from a network of interconnected broker computers. The sequence commences with an initial broker computer connected to a sending computer and terminates with a final broker computer connected to a receiving computer. The message path is statistically estimated to fulfill the at least one quality of service requirement. A transmitting operation transmits a message from the initial broker computer to the receiving computer via the sequence of broker computers specified by the message path. The method further includes receiving quality of service metrics about the network of interconnected broker computers. A determining operation determines whether the message path fulfills the at least one quality of service requirement based on the quality of service metrics. If the message path is determined not to fulfill the at least one quality of service requirement, the calculating operation is repeated for a new message path specifying a new sequence of broker computers selected from the network of interconnected broker computers. The new message path is statistically estimated to fulfill the at least one quality of service requirement.

Another aspect of the invention is a broker computer coupled to a network of interconnected broker computers for transmitting data according to at least one quality of service requirement. The broker computer includes a calculating unit configured to calculate a message path specifying a sequence of broker computers selected from the network of interconnected broker computers. The sequence commences with an initial broker computer connected to a sending computer and terminates with a final broker computer connected to a receiving computer. The message path is statistically estimated to fulfill the at least one quality of service requirement.

The broker computer further includes a transmitting unit and a receiving unit. The transmitting unit is configured to transmit a message from the initial broker computer to the receiving computer via the sequence of broker computers specified by the message path. The receiving unit is configured to receive quality of service metrics about the network of interconnected broker computer. A determining unit of the broker computer is configured to determine whether the message path fulfills the at least one quality of service requirement based on the quality of service metrics. If the message path is determined not to fulfill the at least one quality of service requirement, the determining unit causes the calculating unit to calculate a new message path specifying a new sequence of broker computers selected from the network of interconnected broker computers. The new message path is statistically estimated to fulfill the at least one quality of service requirement.

Yet another aspect of the invention is a computer program product for transmitting data according to at least one quality of service requirement. The computer program product comprises a computer readable storage medium having computer readable program code embodied therewith. The computer readable program code is configured to: calculate a message path specifying a sequence of broker computers selected from a network of interconnected broker computers, the sequence commencing with an initial broker computer connected to a sending computer, the sequence terminating with a final broker computer connected to a receiving computer, the message path being statistically estimated to fulfill the at least one quality of service requirement; transmit a message from the initial broker computer to the receiving computer via the sequence of broker computers specified by the message path; receive quality of service metrics about the network of interconnected broker computers; determine whether the message path fulfills the at least one quality of service requirement based on the quality of service metrics; and if the message path is determined not to fulfill the at least one quality of service requirement, execute the calculate program code for a new message path specifying a new sequence of broker computers selected from the network of interconnected broker computers, the new message path being statistically estimated to fulfill the at least one quality of service requirement.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
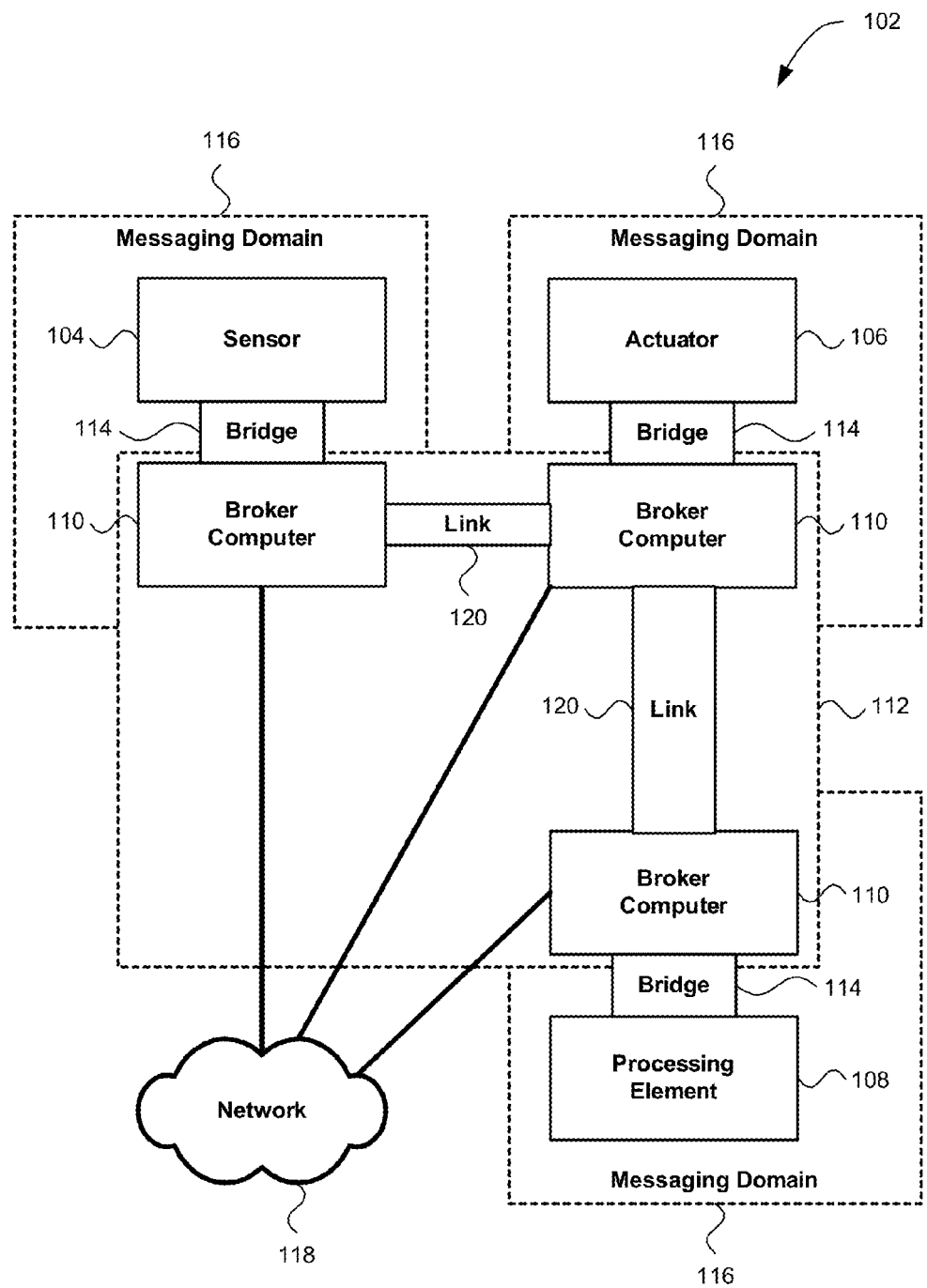
FIG. 1 shows an example environment embodying the present invention.

The present invention is described with reference to embodiments of the invention. Throughout the description of the invention reference is made to FIGS. 1-11. When referring to the Figures, like structures and elements shown throughout are indicated with like reference numerals.

Referring now to FIG. 1, an example environment 102 embodying the present invention is shown. It is initially noted that the environment 102 is presented for illustration purposes only, and is representative of countless configurations in which the invention may be implemented. Thus, the present invention should not be construed as limited to the environment configurations shown and discussed herein.

The environment 102 includes nodes 104, 106, 108. A node may be any of wide variety of technological devices. A node may be implemented in hardware, software or a combination thereof. A node may be a computer or may be software which executes at a computer. In either case, the computer may comprise one or more computer processors. The nodes may be heterogeneous in terms of hardware characteristics, software characteristics, or both.

A node may be, or may comprise, a sensor 104. A sensor may generate and transmit event data. A node may also be, or may comprise, an actuator 106. An actuator may receive and act on control directives. The sensors and actuators may be deployed in the field.

A node may also be, or may comprise, a processing element 108. A processing element may embody back-end processing capabilities, such as analytics capabilities. A processing element may perform back-end processing tasks, such as event processing. A processing element may be located at a data center or a back-end office.

It is noted that while three nodes suffice to demonstrate the present invention, the number of nodes included in the environment is not limited to three. To the contrary, the number of nodes may be very large.

The nodes 104, 106, 108 are interconnected with each other. This interconnection enables the nodes to communicate with each other. It is emphasized that as a result, the sensors 104 and actuators 106 included in the environment are interconnected with, and can communicate with, the processing elements 108.

It is emphasized that the environment 102 may be deployed across a wide geographic area. Specifically, any nodes included in the environment, including any sensors 104 and actuators 106, may be deployed across a wide geographic area.

The nodes included in the environment 102 may constitute an event-driven system. Thus, some nodes, such as the sensors 104, may generate events. Other nodes, such as the processing elements 108, may respond to the events.

The environment 102 further includes a plurality of broker computers 110. A broker computer may be a general purpose computer. Such a computer may incorporate any of a wide variety of architectures. The computer may be based on a general purpose operating system such as the IBM® z/OS® operating system, the IBM AIX® operating system, the Linux® operating system, any flavor of the UNIX® operating system or the Windows® operating system. IBM, z/OS and AIX are registered trademarks of International Business Machines Corporation, Armonk, N.Y., United States, in the United States, other countries, or both. Linux® is the registered trademark of Linus Torvalds in the United States and other countries. UNIX is a registered trademark of The Open Group in the United States and other countries. Windows is a registered trademark of Microsoft Corporation, Redmond, Wash., United States, in the United States and/or other countries. A broker computer may also be a special purpose computer manufactured specifically to implement the present invention.

A broker computer 110 may comprise one or more computer processors. A broker computer may also incorporate any of a wide variety of computer program products. The broker computers may be heterogeneous in terms of hardware characteristics, software characteristics, or both.

The broker computer 110 may comprise a software application or computer program product embodying logic implementing any or all of the operations described hereinafter as being performed by the broker computer. Thus, executing this software application or computer program product at the broker computer causes the broker computer to act as a broker according to the present invention.

The broker computers 110 are interconnected with each other so as to form a network 112. The interconnected broker computers collectively implement a messaging fabric which interconnects the nodes 104, 106, 108. To achieve this goal, the interconnected broker computers transmit messages between nodes. The messaging fabric may be middleware.

The messaging fabric provides messaging functionality. Messaging may include any of a wide variety of techniques for exchanging information. Messaging may be implemented using a wide variety of methods. Messaging may be provided as a layer in a wider system which provides application-level connectivity for all components within the wider system. Accordingly, messaging may be a mechanism which facilitates the integration of diverse system components.

In an embodiment of the present invention, the broker computers 110, the nodes 104, 106, 108, or both implement the Java™ Messaging System standard. Java is a trademark or registered trademark of Sun Microsystems, Inc., Santa Clara, Calif., United States, or its subsidiaries in the United States and other countries. The foregoing system components may employ this standard to understand the exchange of messages among themselves.

The broker computers 110 may be peers in a peer-to-peer network structure. As such, the brokers may not be assigned the roles of clients and servers.

The broker computers 110, and the messaging fabric implemented thereby, may be spread over a wide geographic area. This advantageously facilitates connecting nodes which are themselves spread over a wide geographic area.

The environment 102 may be a distributed system. In this sense, the nodes 104, 106, 108, the broker computers 110, or both may be distributed.

Each node 104, 106, 108 included in the environment may be connected to one or more broker computers 110. The connection between a node and a broker computer may be effected by a bridge component 114.

Each node may be directly connected to a small number of broker computers. This is possible because a node may communicate with other nodes via a broker computer to which it is connected. This broker computer may cause the communication to be retransmitted to the destination node. A node may even be unaware of broker computers other than those to which it is directly connected.

In an embodiment of the present invention, each node is directly connected to one or fewer broker computers. In an embodiment of the present invention, each node is directly connected to two or fewer broker computers. In another embodiment of the present invention, each node is directly connected to three or fewer broker computers.

The environment 102 may further include a plurality of disparate messaging domains 116. Disparate messaging domains may be deployed at different locations. Disparate messaging domains may be associated with different organizations. Disparate messaging domains may employ different network protocols. Different nodes 104, 106, 108 may be located at different messaging domains. Likewise, different broker computers 110 may be located at different messaging domains. Entities within a common messaging domain may be considered to be local to each other.

For performance reasons, any or all of the nodes 104, 106, 108 in the environment 102 may be connected to a broker computer 102 which is located within the same messaging domain 116. Thus, a messaging domain may comprise one or more broker computers and all of the nodes which are connected to any broker computer comprised by the messaging domain. The broker computers comprised by the messaging domain may then be responsible for communication between nodes comprised by the messaging domain and nodes in other messaging domains.

The environment further includes one or more networks 118. A network may be any of a wide variety of systems known in the art for allowing two or more systems to communicate. A network may be, or may comprise, the public Internet or a subset thereof. A network may also be, or may comprise, another type of public network, such as the public switched telephone network (PSTN). A network may also be, or may comprise, a virtual private network (VPN) or another type of private network. A network may be, or may comprise, a wide area network (WAN) or a local area network (LAN). Notably, the networks may be heterogeneous, although this is not required.

A network 118 may employ any of a wide variety of network technologies such as Ethernet, IEEE 802.11, IEEE 802.16, the Bluetooth® technology, token ring, Digital Subscriber Line (DSL), cable Internet access, satellite Internet access, Integrated Services Digital Network (ISDN) and dial-up Internet access. Bluetooth is a registered trademark of Bluetooth SIG, Inc., Bellevue, Wash., United States. A network may include various topologies and protocols known to those skilled in the art, such as TCP/IP, UDP, and Voice over Internet Protocol (VoIP). A network may comprise direct physical connections, radio waves, microwaves or any combination thereof. Furthermore, a network may include various networking devices known to those skilled in the art, such as routers, switches, bridges, repeaters, etc.

The interconnected broker computers 110 may communicate via any or all of the networks 118. More specifically, messages transmitted by any of the broker computers may be transmitted over any or all of the networks. It is emphasized that a messaging fabric implementing the present invention can be deployed to facilitate messaging via any of the foregoing types of networks.

The interconnected broker computers 110 may be connected to each other via network links 120. The network links may be provided by any or all of the networks 118. Each broker computer may have direct network links to only a small number of neighboring broker computers. If a broker computer wishes to communicate with a broker computer to which is not directly linked, the communication may be routed through other broker computers until it reaches the destination broker computer. It is emphasized that as a result, pair-wise connections between each pair of broker computers are not required.

It is noted that WAN's, including the public Internet, present several challenges from a communications standpoint. Generally speaking, WAN's have different dynamics and failure patterns than LAN's, such as the network found in a data center. Specifically, because WAN's are typically spread over a wide geographic area, communications via WAN's are frequently long-haul communications. As a result, communication via WAN's frequently has poor reliability (e.g., is error-prone). Communication via WAN's also frequently has high latency, or very high latency, between nodes. Moreover, the public Internet and other Internet Protocol (IP)-based services provide only best-efforts connectivity. Those skilled in the art will appreciate that best-efforts connectivity does not offer any specific quality of service guarantee. Furthermore, applications typically cannot control the network behavior of a WAN.

The environment 102, and communication between the nodes 104, 106, 108 included therein, may facilitate any of a wide variety of applications in any of a wide variety of application domains. The applications may include without limitation aviation information and airspace surveillance systems, intelligent transportation systems, smart grids for energy production and distribution, smart electricity and utility networks, command and control centers for smart cities, smart water management, and emergency preparedness and response. The applications may be mission critical in nature. The nodes may be endpoints of the application.

In furtherance of such applications, a wide variety of event data and control directives may be transported among the sensors 104, the actuators 106, and the processing elements 108 (possibly including data centers and back-end offices at which the latter are located) through the messaging fabric. This may occur for any of the applications described above. However, it is contemplated that the specific event data and control directives vary depending on the specific application.

In many situations, data transmitted according to the present invention, such as the data generated by the sensors and control directives, are time-sensitive, mission critical, or both. For example, sensors in a power grid may monitor the status of the grid and detect potential power outages. These sensors may generate events. An event may be an alarm indicating a potential power outage. Unless the alarm is promptly received, it may be too late to prevent an actual power outage. Thus, the events generated by the sensors must clearly be delivered in a reliable manner, as failure to detect an alarm is clearly harmful. It follows that this sensor data indicating a failure event within a power grid is clearly time-sensitive and mission critical.

Similarly, sensor data indicating a location of one or more suspicious aircraft is clearly time-sensitive and mission critical. Switch control commands are also commonly time-sensitive and mission critical. More generally, many applications known in the art require information to be delivered in a time-sensitive and highly reliable manner.

The messaging fabric is operable to provide a defined, and therefore predictable, quality of service (QoS). In other words, the messaging fabric is QoS-aware. Providing QoS may include effecting one or more quality of service requirements for messages and data transmitted via the messaging fabric. The QoS requirements which may be enforced by the messaging fabric include without limitation latency, reliability, availability and throughput. The QoS requirements may be enforced on an end-to-end basis.

The present invention comprises a framework and set of mechanisms for providing this defined quality of service within the messaging fabric. This is achieved by effectively addressing the dynamics and heterogeneity of the underlying networks and systems over which the messaging fabric operates. This is further achieved by addressing any failure conditions occurring within these networks and systems.

Providing a defined, predictable QoS may beneficially cause messages to be delivered across components and subsystems in a reliable and timely manner. This is clearly advantageous in the case of data which are time-sensitive, mission-critical or both.

Moreover, different messages may have different QoS requirements. Differentiated QoS requirements may be specified based on a wide variety of criteria. QoS requirements may be specified per message topic, such that all messages pertaining to a specified topic share a set of QoS requirements. QoS requirements may be specified per connection session, such that all messages within a connection session share a set of QoS requirements. QoS requirements may even be specified for an individual message.

In order to transmit a message, a sending node 104, 106, 108 may initially transmit the message to a broker computer 110 to which the sending node is connected. This broker computer may then determine a routing path for the message. The routing path may comprise a sequence of broker computers. Adjacent broker computers in this sequence may be directly connected to each other. Thus, each broker computer may, in turn, transmit the message to the next broker computer in the sequence. The final broker computer in the sequence may then transmit the message to the receiving node. The routing path may also specify the sending node, the receiving node, or both.

The present invention includes a routing algorithm configured to establish routing paths as described above. These routing paths are subject to the end-to-end QoS requirements, including any latency and availability requirements so imposed.

The broker computers 110 may monitor the networks, the broker computers, the nodes 104, 106, 108, or any combination thereof. The monitoring may be performed periodically. The monitoring may also be chronic and continuous. Such monitoring may detect that the QoS requirements are violated for one or more routing paths. The QoS requirements are considered to be violated when the actual performance of the routing path contradicts any or all of the QoS requirements. Whenever a violation of QoS requirements is detected, the routing paths are adjusted. The adjusted routing path is intended to conform to the QoS requirements. In this manner, the present invention automatically manages the routing paths to ensure that they conform to the QoS requirements even as network conditions and the system state change over time.

In an embodiment of the present invention, a message is transmitted using multi-path routing. Specifically, a plurality of routing paths is determined as described above. Message replication is performed such that a duplicate copy of the message is transmitted along each of the routing paths. Thus, the message will be received as long as one instance of the message reaches its destination. This may occur even if a proper subset of the routing paths has failed.

As a result, multi-path routing advantageously increases the reliability of messaging. This helps to achieve QoS requirements regarding reliability. Moreover, multi-path routing increases the probability of meeting a QoS requirement specifying a maximum latency. This is because even if one instance of the message is delayed, another instance of the message may still arrive in time. However, the foregoing advantages are achieved at the expense of increased traffic.

It is noted that multi-path routing does not inherently require acknowledgement and retransmission of the message. Thus, multi-path routing does not cause the latency penalty associated with this acknowledgement and retransmission.

In an embodiment of the present invention, the broker computers 110 may collectively implement a messaging fabric which provides messaging according to a publish/subscribe paradigm. In this paradigm and embodiment, a publisher publishes information. The publisher may be a node 104, 106, 108 in the environment 102. The information may include any type of data and may be expressed in the form of a message. Subscribers who are interested in the information subscribe thereto. The subscribers may also be nodes in the environment. An arbitrary and possibly large number of subscribers may subscribe to the information transmitted by a single publisher. The publisher transmits the information to a broker computer. The broker computer then dispatches the information to each of the subscribers, possibly with the assistance of other broker computers. It is emphasized that as a result, QoS is provided for messaging according to the publish/subscribe paradigm.

It is noted that the nodes may be endpoints of the publishers and subscribers as opposed to the publishers and subscribers themselves.

As noted above, each node may be connected to a local broker computer. Because the publishers and subscribers are nodes, each publisher and each subscriber, or the endpoints thereof, may thus be connected to a local broker computer, e.g., a broker computer in the same messaging domain 116. Conversely, each broker computer may be attached to at least one publisher and at least one subscriber in the same messaging domain.

In a further embodiment of the present invention, the publish/subscribe paradigm is topic-based. Topics assist publishers and subscribers in understanding which data are useful to the other party. A topic may be interpreted as a tag which is applicable to all information associated with a category identified by the topic. Accordingly, a publisher specifies a topic which describes the information published thereby. A subscriber may then subscribe to this topic in order to receive this information. An arbitrary and possibly large number of subscribers may subscribe to a single topic. Differentiated QoS requirements may be specified for each message topic as described above.

Thus, for each topic, the broker computers may establish and manage routing paths as described above in order to connect all publishers and subscribers in the environment 102 which publish or subscribe on that topic. The routing paths are established subject to the QoS requirements of the application and the system state.

It is noted that publish/subscribe messaging fabrics are efficient for enabling large numbers of system components to communicate with each other. Moreover, in publish/subscribe systems, a subscriber is not required to be aware of the identity of the publisher, and vice versa. Thus, information producers and consumers are decoupled. As a result, the scalability of the messaging system is increased. Moreover, publishers and subscribers do not need to remain online at all times. Furthermore, not being aware of the identity of other participants increases security and privacy. By enabling publish/subscribe messaging, this embodiment advantageously provides the foregoing advantages.

Additionally, the publish/subscribe paradigm is advantageous for implementing service-oriented architectures (SOA's). Thus, this embodiment advantageously facilitates communication within SOA's.

In another embodiment of the present invention, the broker computers may collectively implement a messaging fabric which provides messaging according to a point-to-point paradigm. In point-to-point messaging, a single sender sends a message to a single receiver. It is emphasized that as a result, QoS is provided for messaging according to the point-to-point paradigm. It is noted that point-to-point messaging is typically synchronous. The sender is aware of the identity of the receiver, and vice versa. Both the sender and receiver must generally be online in order to communicate. Point-to-point messaging is also known in the art as send and receive communication.

The messaging paradigms which may be provided by the messaging fabric implementing the present invention are not limited to the foregoing. The broker computers may collectively implement a messaging fabric which provides messaging according to any of a wide variety of advanced messaging paradigms. Furthermore, the messaging fabric may implement multiple messaging paradigms. For example, the same messaging fabric may provide both messaging according to a publish/subscribe paradigm and messaging according to a point-to-point paradigm.

In an embodiment of the present invention, the messaging fabric employs an overlay-based approach. Specifically, a set of broker computers are inter-connected via an Application-layer overlay network. QoS requirements are addressed through a set of overlay routing and resource scheduling mechanisms. The routing algorithm is an overlay routing algorithm. The overlay routing mechanisms may be operable to intelligently redirect messages to bypass a failed or congested network link.

It is emphasized that a messaging fabric implementing the present invention is advantageously capable of managing the latency and reliability issues inherent to WAN's. Therefore, a messaging fabric implementing the present invention ensures that the QoS requirements are met even when the messaging fabric transmits messages over WAN's, including the public Internet. Furthermore, in order for a messaging fabric to interconnect sensors 104 and actuators 106 over a wide geographic area, it may be advantageous or necessary for the messaging fabric to operate over WAN's, the public Internet, or both. Thus, the present invention advantageously enables sensors and actuators to be interconnected over a wide geographic area while maintaining QoS standards.

Similarly, a messaging fabric implementing the present invention ensures that the QoS requirements are met even when the messaging fabric transmits messages over heterogeneous networks.

Moreover, messaging fabrics implementing the present invention may advantageously provide QoS even if the underlying networks employed by the messaging fabric fail to provide any QoS assurances. This is possible because the present invention is capable of intelligently redirecting messages to bypass failed or congested network links without requiring any intervention by the underlying networks. This may be achieved using overlay routing as described above. Because the public Internet does not provide any QoS assurances, these properties beneficially allow messaging fabrics implementing the present invention to be deployed over, and to provide QoS over, the public Internet. Similarly, many VPN's known in the art do not provide QoS assurances. These properties beneficially allow messaging fabrics implementing the present invention to be deployed over, and to provide QoS over, such VPN's.

Similarly, the present invention may advantageously provide QoS even without control of the physical networks employed by the messaging fabric. Because applications typically cannot control the network behavior of a WAN, this property beneficially allows messaging fabrics implementing the present invention to provide QoS over WAN's.

A messaging fabric implementing the present invention is beneficially scalable. Such a messaging fabric may connect large numbers of nodes, including sensors, actuators, or both, while maintaining QoS standards. This scalability is possible because, for the reasons noted above, each node only needs to be aware of a small number of broker computers and each broker computer only needs to be aware of a small number of neighboring broker computers. Notably, the present invention does not require pair-wise connections between each pair of entities across the system which may wish to communicate. Minimizing the number of direct connections is critical to the scalability of the system.

Figure 2:
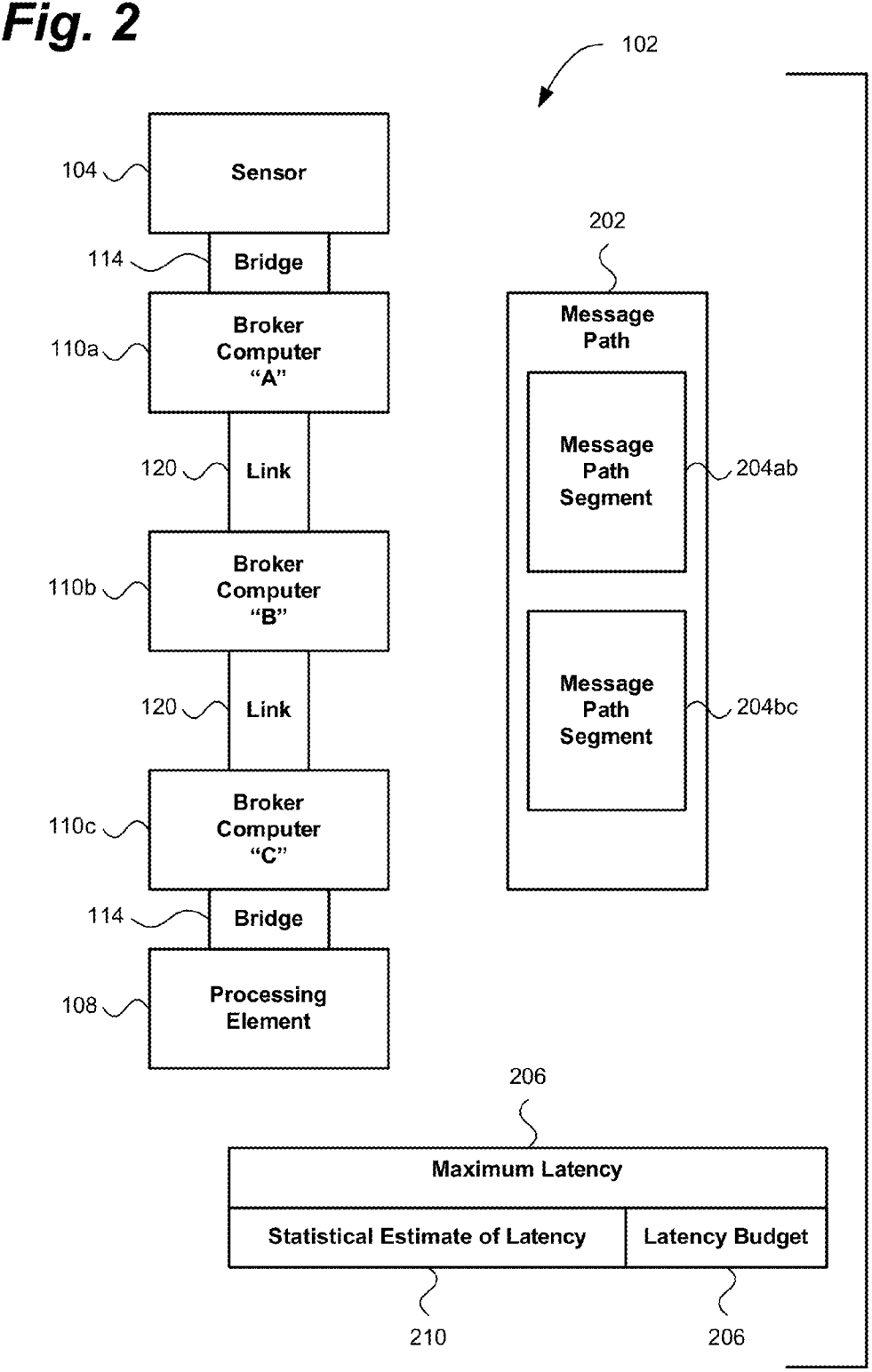
FIG. 2 illustrates an example message path.

Turning now to FIG. 2, an example message path is illustrated.

The message path and the entities shown in FIG. 2 exist within an environment 102 such as the example environment shown in FIG. 1. In the example environment, a sensor 104 is configured to send event data to a processing element 108. The processing element is configured to receive and process this event data. The sensor and the processing element are nodes. Furthermore, the sensor and the processing element are computers. The sensor is a publisher in a publish/subscribe system, and the processing element is a subscriber in the publish/subscribe system.

The sensor 104 is directly connected to broker computer "A" 110a. The sensor is not directly connected to any other broker computer. The sensor and broker computer "A" are located in the same messaging domain.

The processing element 108 is directly connected to broker computer "C" 110c. As with the sensor, the processing element is not directly connected to any other broker computer. The processing element and broker computer "C" are located in the same messaging domain. This messaging domain is disparate from the messaging domain including the sensor and broker computer "A".

No direct connection exists between broker computer "A" 110a and broker computer "C" 110c. However, broker computer "A" is directly connected to broker computer "B" 110b. Broker computer "B" is directly connected to broker computer "C". Thus, communication between broker computer "A" and broker computer "C" may be achieved by routing the communication via broker computer "B".

A message path 202 is calculated to specify a route by which messages may travel through the network of interconnected broker computers 110. The message path specifies a sequence of broker computers selected from the network of interconnected broker computers. The sequence commences with an initial broker computer 110a connected to a sending computer 104. The initial broker computer and the sending computer may be included in the same messaging domain. The sequence terminates with a final broker computer 110c connected to a receiving computer 108. The final broker computer and the receiving computer may be included in the same messaging domain.

In the example environment 102, the message path 202 specifies a sequence commencing with broker computer "A"

110*a*. The next broker computer in the sequence is broker computer "B" 110*b*. The sequence terminates with broker computer "C" 110*c*.

In an embodiment of the present invention, the message path is the complete routing path. The message path does not need to expressly specify the sending computer and the receiving computer, e.g., the publisher and the subscriber. This is because the sending computer is directly connected to the initial broker computer and the receiving computer is directly connected to the final broker computer. Therefore, the message path is, by itself, sufficient to route to the sending computer and the receiving computer.

In another embodiment of the present invention, the message path is a subset of a broader routing path including elements external to the network of interconnected broker computers. For example, a routing path may begin with the sending computer 104. The following elements in the routing path may be the broker computers 110 included in the message path in the specified order. The routing path may then end with the receiving computer 108.

The message path may expressly or implicitly define a sequence of message path segments 204. A message path segment commences with a broker computer in the sequence and terminates with the subsequent broker computer in the sequence. Thus, the message path 202 includes two message path segments. One message path segment 204*ab* commences with broker computer "A" 110*a* and terminates with broker computer "B" 110*b*. Another message path segment 204*bc* commences with broker computer "B" 110*b* and terminates with broker computer "C" 110*c*. Each message path segment may represent the network link 120 between the broker computers connected by the message path segment.

The message path may be calculated by one or more of the broker computers. Thus, the routing decisions may be effected by broker computers. In an embodiment of the present invention, the message path is calculated by the initial broker computer 110*a* in the sequence. As noted above, this broker computer is directly connected to the sending computer.

Regardless, each broker computer 110 in the network of interconnected broker computers may be configured to compute and install message paths as described above. As a result, each broker computer may calculate a suitable message path for messages originating from a sending computer to which the broker computer is connected. The broker computer may perform this calculation locally, e.g., without needing to consult any other broker computer. Therefore, a single point of failure in the path establishment process is beneficially avoided.

The initial broker computer 110*a* in the message path may receive a message from the sending node 104. The initial broker computer may forward the message to the second broker computer in the sequence. Each intermediate broker computer in the sequence may, in turn, forward the message to the next broker computer in the sequence. The final broker computer 110*c* may then forward the message to the receiving node. It is emphasized that the intermediate broker computers in the sequence are forwarding the messages on behalf of the broker computers at the edges of the sequence.

Thus, in the example environment 102, broker computer "A" 110*a* receives a message from the sending node 104. Broker computer "A" forwards the message to broker computer "B" 110*b*. Broker computer "B" forwards the message to broker computer "C" 110*c*. Broker computer "C" forwards the message to the processing element 108.

Each broker computer 110 in the network of interconnected broker computers may be configured to forward messages to neighboring brokers. Accordingly, any broker receiving a message may forward the message to the next broker in the message path for the message.

Each broker computer 110 in the network of interconnected broker computers may be configured to perform message mediation. Such message mediation may include format transformation. Format transformation may include translating between two different Extensible Markup Language (XML) schemas. Extensible Markup Language and XML are trademarks (registered in numerous countries) of the World Wide Web Consortium; marks of W3C are registered and held by its host institutions MIT, ERCIM, and Keio. For example, a publisher may send in one XML schema and the subscriber may expect a different XML schema.

Moreover, the broker computers may be configured to calculate latency budgets 206. A latency budget is the amount of extra latency which can be tolerated if a QoS requirement specifying a maximum latency 208 is to be met. A statistical estimate 210 of the latency of the message path may have been calculated. In this case, the latency budget can be determined by subtracting the statistically estimated latency of the message path from the maximum latency. The latency budget may then be distributed among the message path segments.

For example, if the QoS requirements specify a maximum latency of 500 ms and the statistically estimated latency of the message path is 300 ms, the latency budget is 200 ms. This latency budget may be distributed among both message path segments 204*ab*, 204*bc*. The latency budget may be distributed according to a variety of techniques, provided that sum of the latency budget assigned to each segment is not greater than 200 ms.

A message path segment may carry diverse types of traffic. The messages traversing the message path segment, the topics of the messages, or both may have different requirements for timeliness. Accordingly, differential latency budgets may be dynamically specified for different messages or topics sharing the common message path segment. If two message paths have a common message path segment, and two messages are pending transmission via the common message path segment, the scheduling problem may be resolved by transmitting the message or topic having the smallest latency budget first. The latency budget therefore may imply the priority of a message. Latency budgets can thus beneficially optimize the latency performance at each message path segment, subject to the end-to-end latency requirements of all messages or topics transmitted via the message path segment.

In an embodiment of the present invention, as described above, the interconnected broker computers implement a publish/subscribe system. The sending computer is a publisher, or an endpoint thereof, in the publish/subscribe system. The receiving computer is a subscriber, or an endpoint thereof, in the publish/subscribe system.

A broker computer connected to a publisher is known as a publishing broker computer. The publishing broker computer may be located in the same messaging domain as the publisher.

Likewise, a broker computer connected to a subscriber is known as a subscribing broker computer. The subscribing broker computer may be located in the same messaging domain as the subscriber.

As described above, the publish/subscribe system may be topic-based. Each broker computer may be capable of matching publishers and subscribers on the same topic. The topic of a message may be specified as metadata associated with the message. The metadata may describe a common feature of the messages in the category identified by the topic. In an embodiment of the present invention, the topic is a string. The topic may be defined by the application communicating via the publish/subscribe system. The topic may be any value which is mutually understood by the relevant publishers and subscribers.

Message paths calculated as described above may connect all publishing broker computers for a topic to all subscribing broker computers for the same topic. For each message path, the publishing broker computer may be the initial broker computer, and the subscribing broker computer may be the final broker computer. The foregoing may be repeated for each topic in the publish/subscribe system.

Moreover, a single broker computer may forward messages for different topics. Latency budgets may be allocated for different topics at each message path segment in order to control the local resource management. The broker computer may manage the distribution of network resources among these topics based on these latency budgets.

More specifically, a variety of messages on different topics may be placed in the same queue at the broker computer. The broker computer decides the order in which the messages are transmitted based on the priority of the messages, which in turn depends on the latency budget of the topic according to the algorithm described above.

A publisher and subscriber which are in communication may be located in disparate messaging domains 116. In particular, a publisher on a given topic and a subscriber for the same topic may be located in disparate messaging domains. In this case, the message path may be calculated and employed as described above.

A publisher and subscriber which are communicating may instead be located in the same messaging domain 116. In particular, a publisher on a given topic and a subscriber for the same topic may be located in the same messaging domain. In this case, the broker computer may directly forward messages between publishers and subscribers located in the same messaging domain. Calculating and employing the message path as described above may be omitted. Alternatively, this case may be expressed as a message path wherein the sequence includes only a single broker computer which is connected to both the publisher and the subscriber.

A subscriber may connect to a subscribing broker computer to request a topic. The subscribing broker computer may analyze data located thereat to determine whether it already receives messages for the topic. If so, the subscribing broker computer may simply begin forwarding messages for the topic to the subscriber. If not, e.g., if no node in the same messaging domain has previously requested the topic, the subscribing broker computer may propagate the topic request to other broker computers. A broker computer receiving the topic request may determine whether it is connected to a publisher for this topic. If so, the broker computer may store an indication that messages for this topic are to be sent to the subscribing broker computer which transmitted the topic request.

Information about requests to subscribe to a topic may ultimately propagate throughout the entire network of broker computers. However, such propagation may be an iterative process. One iteration, two iterations, or more may be required before the topic request is received at any particular broker computer in the network. Nonetheless, a publishing broker computer may eventually be aware of the identity of all subscribers to the information published by the publisher.

Figure 3:
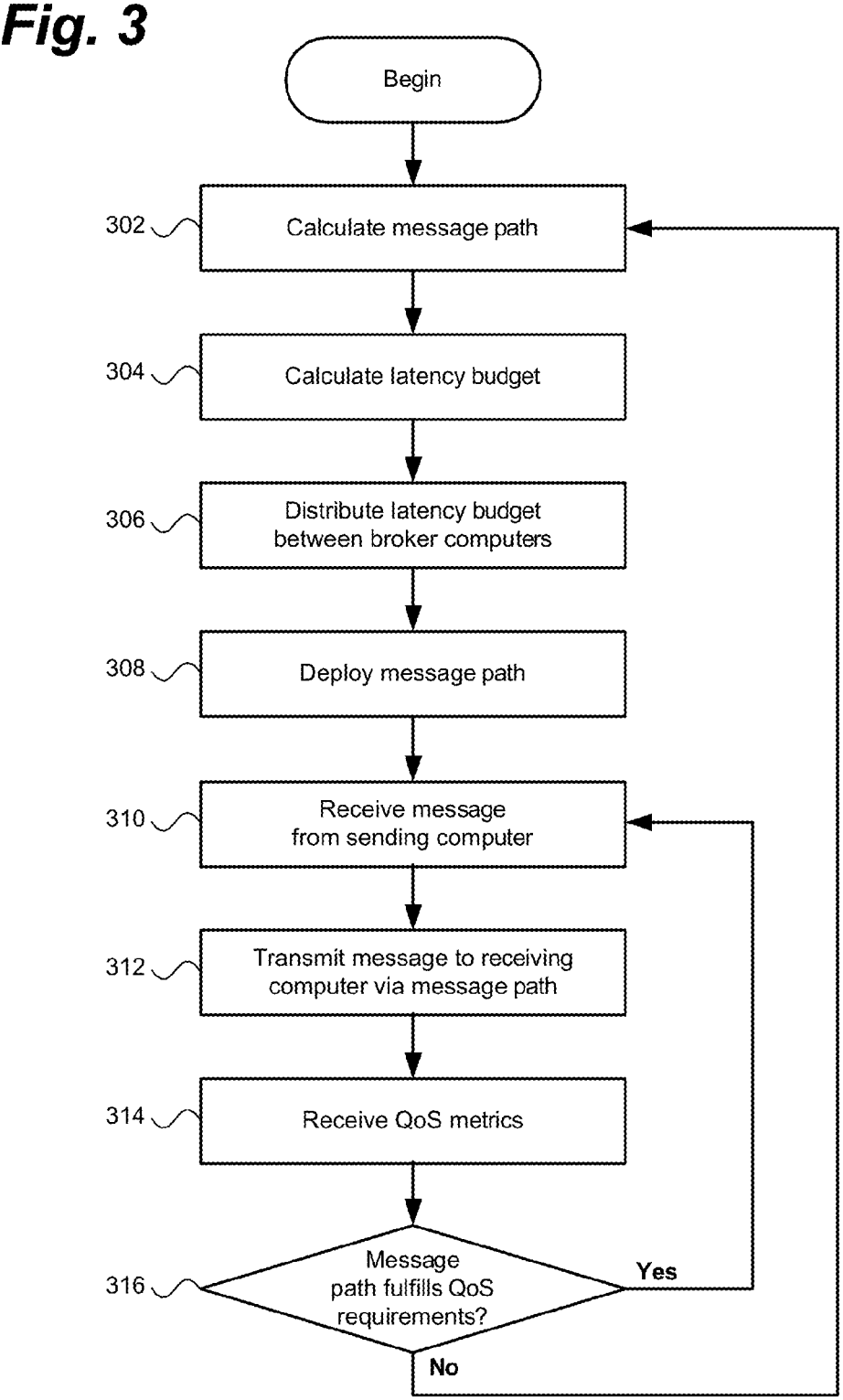
FIG. 3 demonstrates an example sequence of operations for transmitting data according to at least one quality of service requirement.

Turning now to FIG. 3, an example sequence of operations for transmitting data according to at least one quality of service requirement is demonstrated.

The sequence of operations shown in FIG. 3 transmits messages according to at least one quality of service requirement. The QoS requirement or requirements may be any of a wide variety of standards impacting the transmission of messages.

A QoS requirement may include a specification of the reliability with which messages are to be transmitted. Reliability may be specified as a maximum probability of failure to transmit a message. Thus, the at least one quality of service requirement may include a maximum probability of failure to transmit the message.

A QoS requirement may also include a specification of the latency with which messages are to be transmitted. Latency may be specified as a maximum latency for transmission of a message. Thus, the at least one quality of service requirement may include a maximum latency for transmission of the message.

Figure 7:
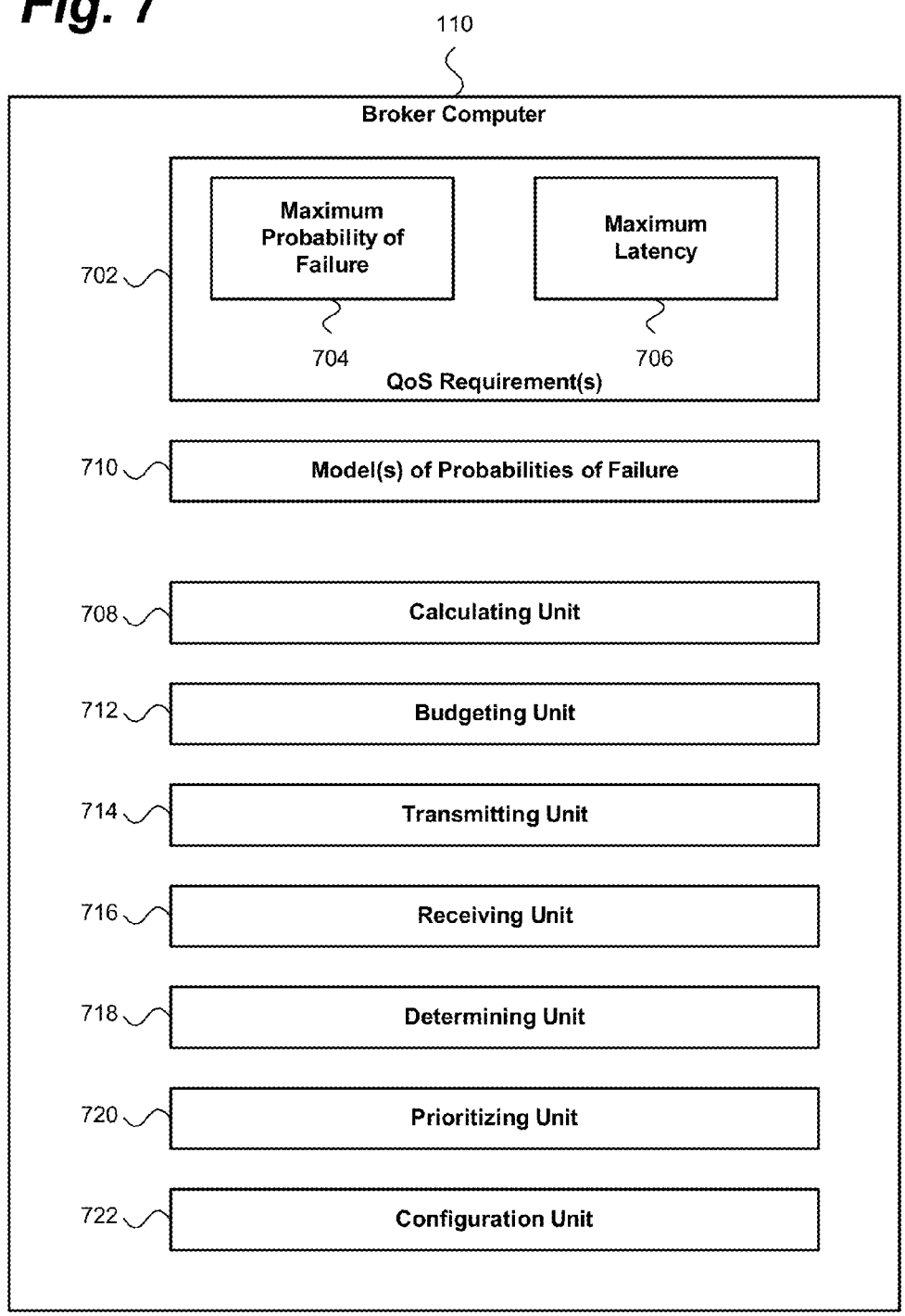
FIG. 7 illustrates an example broker computer for transmitting data according to at least one quality of service requirement.

The sequence of operations shown in FIG. 3 may execute at a broker computer, such as the broker computer shown in FIG. 7 or any of the broker computers shown in FIG. 1. The broker computer may be included in a network of interconnected broker computers, such as the network of broker computers shown in FIG. 1.

The broker computer performing the sequence of operations may be connected to a sending computer. The sending computer may be a node as shown in FIG. 1. The sending computer may transmit one or more messages to the broker computer for retransmission to a receiving computer. The receiving computer may be a node as shown in FIG. 1. The broker computer may cause the messages received from the sending computer to be retransmitted to the receiving computer. This retransmission may occur via one or more message paths as described below. The broker computer performing the sequence of operations may be the initial broker computer in the message path or message paths, except where otherwise noted.

In an embodiment of the present invention, the sending computer is a publisher in a publish/subscribe system. The receiving computer is a subscriber in a publish/subscribe system.

The sequence of operations shown in FIG. 3 may execute simultaneously at multiple broker computers included in the network. Each such broker computer may transmit a significant number of messages. It is emphasized that network congestion may occur as a result. The present invention includes techniques for handling this network congestion as described below.

In an embodiment of the present invention, messages are transmitted via a single path. This embodiment is hereinafter described as the single path embodiment.

In another embodiment of the present invention, messages are transmitted using multi-path routing as described above in regard to FIG. 1. This embodiment is hereinafter described as the multi-path embodiment.

It is noted that subsequent description of the sequence of operations shown in FIG. 3 is performed for both of the foregoing embodiments, except as otherwise noted.

At calculating operation 302, a message path is calculated. The message path specifies a sequence of broker computers selected from the network of interconnected broker computers. The sequence commences with an initial broker computer connected to the sending computer. The sequence terminates with a final broker computer connected to the receiving computer.

The message path may be statistically estimated to fulfill the at least one quality of service requirement. Moreover, if the at least one quality of service requirement includes a maximum latency for transmission of the message, the latency of the message path is statistically estimated. The statistically estimated latency may be compared to the maximum latency allowed to ensure that the former is less than or equal to the latter.

Figure 5:
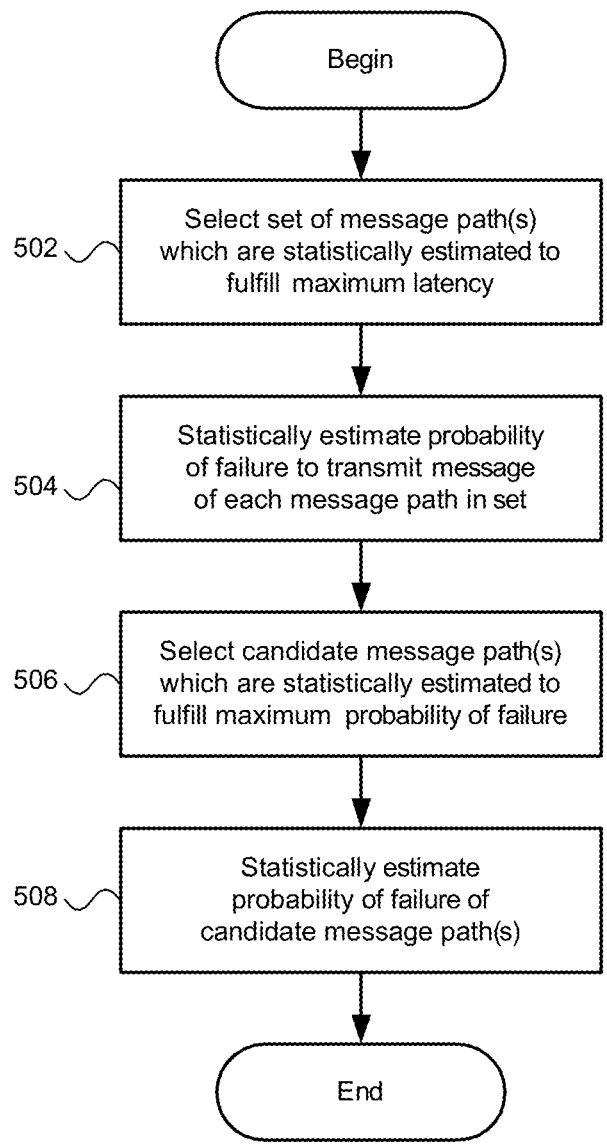
FIG. 5 demonstrates an example sequence of operations for calculating a message path.

In an embodiment of the present invention, calculating operation 302 includes the sequence of operations shown in FIG. 5 or a subset thereof.

In the single path embodiment, calculating operation 302 calculates a single message path as described above. The calculated single message path is statistically estimated to fulfill the at least one quality of service requirement.

In the multi-path embodiment, calculating operation 302 calculates a plurality of message paths. Each of the message paths is calculated as described above. The calculated plurality of message paths is statistically estimated to collectively fulfill the at least one quality of service requirement.

The number of message paths calculated may be a parameter. This parameter may have a value of two. This parameter may also be specified by a system administrator. This parameter may also be selected to achieve a desired level of resiliency. This selection may be based on estimates of the probabilities of failure of broker computers, network links between broker computers, or both. These estimates may be based on one or more models of probabilities of failure such as the failure models shown in FIG. 7. The minimum number of message paths which is sufficient to ensure that a QoS requirement specifying a maximum probability of failure is met may be calculated based on these estimates. The result may be employed as the parameter. Thus, the number of message paths for multi-path routing may be calculated based on the failure model or failure models.

The plurality of message paths may be parallel to each other. In other words, the message paths may be configured so that no two message paths transmit data over a common segment between two broker computers. For example, if the parameter for the number of message paths is equal to the number of neighboring broker computers to which the initial broker computer is connected, each message path may include a different neighboring broker computer. This beneficially ensures that a failure in the link connecting the two broker computers does not cause multiple message paths to fail. Even if it is impossible or infeasible for all of the message paths to be completely parallel, segments of the message paths may be parallel to each other.

Calculating operation 302 may include storing the calculated message path or plurality of message paths may be stored in a computer readable storage medium. As a result, the message path or message paths can be retrieved in order to determine how to route subsequently received messages.

After calculating operation 302 is completed, control passes to calculating operation 304.

At calculating operation 304, a latency budget is calculated. Calculating the latency budget comprises subtracting a statistically estimated latency of the message path from the maximum latency. The statistically estimated latency may be the value calculated at calculating operation 302 as described above.

If the at least one quality of service requirement does not specify a maximum latency, calculating operation 304 may be omitted.

Calculating operation 304 may perform the calculations described above for each message path calculated at calculating operation 302. Accordingly, in the single path embodiment, calculating operation 304 performs the calculations described above for the calculated single message path. In the multi-path embodiment, calculating operation 304 performs the calculations described above for each of the calculated plurality of message paths.

After calculating operation 304 is completed, control passes to distributing operation 306.

At distributing operation 306, the latency budget calculated at calculating operation 304 is distributed among message path segments between broker computers specified by the message path. Distributing operation 306 may equally divide the latency budget among the message path segments. Distributing operation 306 may also proportionally divide the latency budget among the message path segments.

If the at least one quality of service requirement does not specify a maximum latency, distributing operation 306 may be omitted.

Distributing operation 306 may perform the calculations described above for each message path calculated at calculating operation 302. Accordingly, in the single path embodiment, distributing operation 306 performs the distribution described above for the calculated single message path. In the multi-path embodiment, distributing operation 306 performs the distribution described above for each of the calculated plurality of message paths.

After distributing operation 306 is completed, control passes to deploying operation 308.

At deploying operation 308, the message path calculated at calculating operation 302 is deployed across the broker computers included in the message path. In an embodiment of the present invention, the current broker computer transmits a signaling message to every other broker computer included in the message path. The signaling message is a signal to each broker computer that a topic will be transmitted through that broker computer. The signaling message further signals that messages received on the topic need to be forwarded to a specific broker computer. As a result of the signaling message, forwarding states are configured in the forwarding component of each broker computer included in the message path. After deploying operation 308 is completed, control passes to receiving operation 310.

At receiving operation 310, a message is received at the initial broker computer from the sending computer. After receiving operation 310 is completed, control passes to transmitting operation 312.

At transmitting operation 312, the message received at receiving operation 310 is transmitted from the initial broker computer to the receiving computer via the sequence of broker computers specified by the message path.

The initial broker computer may invoke the transmission along the entire message path. However, the initial broker computer may itself only be responsible for sending the message to the second broker computer in the sequence. As described above, each intermediate broker computer in the sequence may, in turn, forward the message to the next broker computer in the sequence. The final broker computer may forward the message to the receiving computer.

In an embodiment of the present invention, transmitting the message from the sending computer to the initial broker computer, between broker computers, from the final broker computer to the receiving computer, or any combination thereof is performed at the Application layer (level 7) of the Open Systems Interconnect (OSI) model. In another embodiment of the present invention, transmitting the message between the aforementioned entities is performed at the Session layer (level 5) of the OSI model. In either case, an application, as opposed to the Network layer (level 3) of the OSI model, is responsible for routing, redirection and forwarding as needed.

Transmitting operation 312 may transmit the message via each message path calculated at calculating operation 302. Accordingly, in the single path embodiment, transmitting operation 312 transmits the message according to the single message path. In the multi-path embodiment, transmitting operation 312 transmits the message according to each of the calculated plurality of message paths. It is noted that in the latter case, duplicate messages may exist if the message paths are not completely parallel. In this case, intermediate brokers may remove the duplicate messages to reduce overhead.

As noted above, network congestion may occur. In particular, a plurality of messages may be awaiting transmission via a common message path segment between broker computers. In this case, the broker computer at which the messages are awaiting transmission may perform the sequence of operations shown in FIG. 6 to determine the order in which the messages are transmitted. The broker computer which executes the sequence of operations shown in FIG. 6 may be the broker computer which is executing the current sequence of operations or may be any other broker included in the message path.

In the example sequence of operations shown in FIG. 3, after transmitting operation 312 is completed, control passes to receiving operation 314. However, this is not inherently the case. Receiving operation 310 and transmitting operation 312 may be repeated for each of a plurality of messages before invoking receiving operation 314. Conversely, receiving operation 314 may be invoked even if receiving operation 310 and transmitting operation 312 have not been performed in the event that no messages require transmission. Notably, receiving operation 314 may be performed at predefined time intervals, regardless of the number of messages transmitted at transmitting operation 312 since the previous iteration of receiving operation 314.

At receiving operation 314, quality of service metrics about the network of interconnected broker computers are received. The quality of service metrics may include at least one resiliency metric, at least one latency metric, or both.

Receiving operation 314 may further include monitoring the network of interconnected broker computers. To achieve this goal, receiving operation 314 may include the sequence of operations shown in FIG. 4 or a subset thereof. The at least one resiliency metric may be determined as described below in regard to FIG. 4. Similarly, the at least one latency metric may be determined as described below in regard to FIG. 4.

The broker computers included in the network of broker computers may periodically, chronically, or continuously monitor each other. To achieve either goal, each broker computer may periodically, chronically or continuously execute receiving operation 314. This iteration of receiving operation 314 may include executing the sequence of operations shown in FIG. 4.

After receiving operation 314 is completed, control passes to determining operation 316.

At determining operation 316, a determination is made as to whether the message path fulfills the at least one quality of service requirement based on the quality of service metrics received at receiving operation 314. Determining operation 316 may also directly analyze measurements of the network state, such as the data described below in regard to FIG. 4.

The message path or the plurality of message paths may fail to meet the QoS requirement for any of a variety of reasons. For example, message path segments may develop network congestion, causing latency to increase.

In the single path embodiment, determining operation 316 determines whether the calculated single message path fulfills the at least one quality of service requirement.

In the multi-path embodiment, determining operation 316 determines whether the calculated plurality of message paths collectively fulfill the at least one quality of service requirement.

If it is determined that the at least one quality of service requirement is fulfilled, control passes to receiving operation 310. Otherwise, control passes to calculating operation 302.

Accordingly, in the single path embodiment, if the message path is determined not to fulfill the at least one quality of service requirement, calculating operation 302 is repeated for a new message path specifying a new sequence of broker computers selected from the network of interconnected broker computers. The new message path is statistically estimated to fulfill the at least one quality of service requirement.

In the multi-path embodiment, if the calculated plurality of message paths is determined not to collectively fulfill the at least one quality of service requirement, calculating operation 302 is repeated for a new plurality of message paths. Each of the new message paths specifies a new sequence of broker computers selected from the network of interconnected broker computers. The new plurality of message paths is statistically estimated to collectively fulfill the at least one quality of service requirement.

If all message paths have failed, determining operation 316 may also cause calculating operation 302 is repeated for a new message path specifying a new sequence of broker computers selected from the network of interconnected broker computers. This may occur even if the failures did not directly cause the QoS requirements not to be met.

A message path or a plurality of message paths may be left in place until the QoS requirements are violated or until all of the message paths have failed.

It is noted that a change in the QoS requirements may not automatically cause the message paths to be recalculated. For example, if the QoS requirements are altered so as to be strictly less stringent, the change in the QoS requirements cannot cause a message path to violate the QoS requirements.

The broker computer may continue to proceed through the loop shown in FIG. 3 until it is taken offline.

Figure 4:
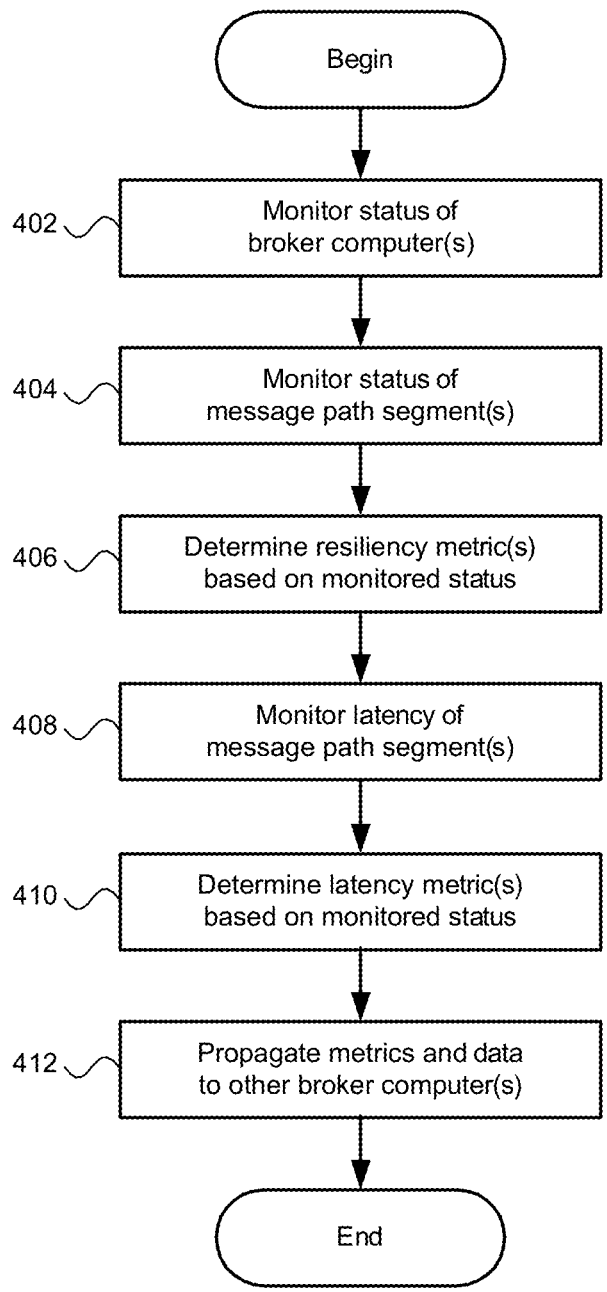
FIG. 4 demonstrates an example sequence of operations for receiving quality of service metrics about the network of interconnected broker computers.

Turning now to FIG. 4, an example sequence of operations for receiving quality of service metrics about the network of interconnected broker computers is demonstrated.

As the term is used below, neighboring broker computers include those broker computers with a direct connection to this broker computer, e.g., the broker computer performing the sequence of operations shown in FIG. 4.

At monitoring operation 402, a status of at least one of the broker computers included in the network of interconnected broker computers is monitored. The status information may be monitored for each neighboring broker computer.

The broker computer may be aware of whether each neighboring broker computer is up or down. This may be achieved by periodically sending ping messages to the neighboring broker computer. Thus, the broker computer may count the number of times each monitored broker computer was down, the duration for which each monitored broker computer was down, or both for the most recent measuring period.

After monitoring operation 402 is completed, control passes to monitoring operation 404.

At monitoring operation 404, a status of at least one message path segment between broker computers included in the network of interconnected broker computers is monitored. The status information may be monitored for the message path segment between the broker computer and each neighboring broker computer. As the term is used herein, a message path segment may include a network link between two broker computers even if the network link is not currently employed by any active message path.

The broker computer may aware of whether each message path segment for which it is an endpoint is up or down. Thus, the broker computer may count the number of times each monitored message path segment was down, the duration for which each monitored message path segment was down, or both for the most recent measuring period.

After monitoring operation 404 is completed, control passes to determining operation 406.

At determining operation 406, at least one resiliency metric is determined based on the status monitored at monitoring operation 402 and monitoring operation 404.

The at least one resiliency metric may include a probability of failure of each broker computer monitored at monitoring operation 402. The at least one resiliency metric may further include a probability of failure of each message path segment monitored at monitoring operation 404.

In an embodiment of the present invention, a moving average is taken of the resiliency metrics. Each new measurement may be averaged together with the preceding measurements. The average may be weighted. The information related to the moving average may be stored and described in any of a variety of data structures known in the art, including arrays, lists and matrices.

After determining operation 406 is completed, control passes to monitoring operation 408.

At monitoring operation 408, a latency of at least one message path segment between broker computers included in the network of interconnected broker computers is monitored. The latency may be measured for each neighboring broker computer, e.g., each broker computer to which this broker computer is connected. After monitoring operation 408 is completed, control passes to determining operation 410.

At determining operation 410, at least one latency metric is determined based on the status monitored at monitoring operation 408. In an embodiment of the present invention, a moving average is taken of the latency metrics. The moving average may be calculated as described above. The at least one latency metric may also include the average latency of messages sent on a specified topic during the most recent measurement window. After determining operation 410 is completed, control passes to propagating operation 412.

It is noted that monitoring operation 402, monitoring operation 404 and determining operation 406 may be performed separately if only the resiliency metric is needed, e.g., if the QoS requirements do not specify a maximum latency. Similarly, monitoring operation 408 and determining operation 410 may be performed separately if only the latency metric is needed, e.g., if the QoS requirements do not specify a minimum reliability.

At propagating operation 412, any or all of the foregoing data are propagated to at least one other broker in the network. The foregoing data may include the at least one resiliency metric, the at least one latency metric, any of the raw data collected, or any combination thereof.

Each broker computer may combine propagated data received from a plurality of other broker computers. As a result, every broker may eventually acquire data about the entire network of interconnected broker computers. This data may include the latency and the probability of failure (e.g., the reliability) for each message path segment in the network. This data may also include the probability of failure for each broker computer in the network. This data may be stored in an array, a data set or in any of a variety of suitable data structures known in the art.

This data may be employed by any broker computer in the network for subsequent message path computation. Notably, this data may be employed by a broker computer connected to a publisher in order to compute a message path to each broker computer connected to a subscriber on the same topic.

After propagating operation 412 is completed, the sequence of operations shown in FIG. 4 is complete. If the operations shown in FIG. 4 were included in receiving operation 314 in FIG. 3, this operation may resume processing. The quality of service metrics received at receiving operation 314 may include the resiliency metric determined at determining operation 406, the latency metric determined at determining operation 410, or both.

Turning now to FIG. 5, an example sequence of operations for calculating a message path is demonstrated.

The sequence of operations shown in FIG. 5 may execute at a broker computer, such as the broker computer shown in FIG. 7 or any of the broker computers shown in FIG. 1. The broker computer may be included in a network of interconnected broker computers, such as the network of broker computers shown in FIG. 1.

The calculating step performed at calculating operation 302 in FIG. 3 may comprise the sequence of operations shown in FIG. 5 or a subset thereof.

The example sequence of operations shown in FIG. 5 assumes that the QoS requirements applicable to the message include both a reliability requirement and a latency requirement. Specifically, the at least one quality of service requirement includes a maximum probability of failure to transmit the message and a maximum latency for transmission of the message. Those skilled in the art may modify the operations shown in FIG. 5 to address other sets of QoS requirements.

As described above, each broker computer may already have a significant amount of data about the network of interconnected broker computers. Notably, this data may include latency and reliability data for the network. Each broker computer may additionally have a graph data structure expressing the structure of the network of interconnected broker computers. The algorithm implemented by the sequence of operations shown in FIG. 5 may process this set of data to determine the optimal message paths in the manner described below.

At selecting operation 502, a set of one or more message paths are selected such that the one or more message paths included in the set are statistically estimated to fulfill the maximum latency for transmission of the message.

Selecting operation 502 may compute the one or more message paths according to a k-shortest path algorithm. The algorithm may be applied to the graph data structure and the latency data described above.

After selecting operation 502 is completed, control passes to estimating operation 504.

At estimating operation 504, a probability of failure to transmit the message of each of the message paths in the set of one or more message paths is statistically estimated.

In an embodiment of the present invention, statistically estimating the probability of failure to transmit the message is based on a combined probability of failure to transmit the message by each of the broker computers in the message path. A broker computer will be unable to transmit the message if the network link between itself and the next broker computer in the sequence (or the receiving computer in the case of the final broker) has failed. Therefore, this estimate may be calculated based on the probability of failure of the relevant network links. The relevant network links include the network links between any two adjacent broker computers in the sequence. The relevant network links may also include the network link between the sending computer and the initial broker computer, the network link between the final broker computer and the receiving computer, or both. The estimate may be further based on a calculated probability of failure of the broker computers in the sequence themselves.

In another embodiment of the present invention, statistically estimating the probability of failure to transmit the message is based on a probability of correlated failures.

In another embodiment of the present invention, statistically estimating the probability of failure to transmit the message is based on one or more models of probabilities of failure. The models of probabilities of failure may be the failure models shown in FIG. 7. It is emphasized that as a result, the computation of the routing paths may consider the failure models in estimating the availability of message paths.

Statistically estimating the probabilities of failure based on the failure model or failure models may be performed to ensure that at any point in time, the probability that at least one path exists between a pair of publishing and subscribing brokers exceeds a target threshold. The threshold may be one minus a maximum probability of failure specified by the QoS requirements.

Furthermore, any or all of the three preceding embodiments may be combined. Thus, statistically estimating the probability of failure to transmit the message may be based on a combination of the factors noted above.

After estimating operation 504 is completed, control passes to selecting operation 506.

At selecting operation 506, at least one candidate message path of the set of one or more message paths is selected such that the at least one candidate message path is statistically estimated to fulfill the maximum probability of failure to transmit the message. Selecting operation 506 is based on the statistically estimated probability of failure to transmit the message. It is emphasized that the at least one selected candidate message path satisfies the resiliency requirement while minimizing the cost, e.g., in terms of time to transmit the message. After selecting operation 506 is completed, control passes to estimating operation 508.

At estimating operation 508, the expected probability of failure of the at least one candidate path selected at selecting operation 506 is statistically estimated. If one candidate path was selected, estimating operation 508 may simply determine the probability of failure for the individual message path as calculated at estimating operation 504. If two or more candidate paths were selected, estimating operation 508 may instead calculate the probability of failure of the candidate paths as a set. This calculation may be based in part on a probability of correlated failures between different candidate message paths.

After estimating operation 508 is completed, the sequence of operations shown in FIG. 5 is complete. If the operations shown in FIG. 5 were included in calculating operation 302 in FIG. 3, this operation may resume processing. In the single path embodiment, calculating operation 302 in FIG. 3 may select any of the candidate message paths as the calculated single message path. In the multi-path embodiment, calculating operation 302 in FIG. 3 may select any or all of the candidate message paths for inclusion in the calculated plurality of message paths.

In an embodiment of the present invention, the network of interconnected broker computers implements a publish/subscribe system as described above. The sequence of operations shown in FIG. 5 may be repeated for each broker computer connected to any subscriber on a specific topic. The sequence of operations shown in FIG. 5 may also be repeated for each broker computer connected to any subscriber on any topic in the system. In either case, the paths to individual subscribing brokers may be merged into a mesh structure by combining common message path segments or network links.

Figure 6:
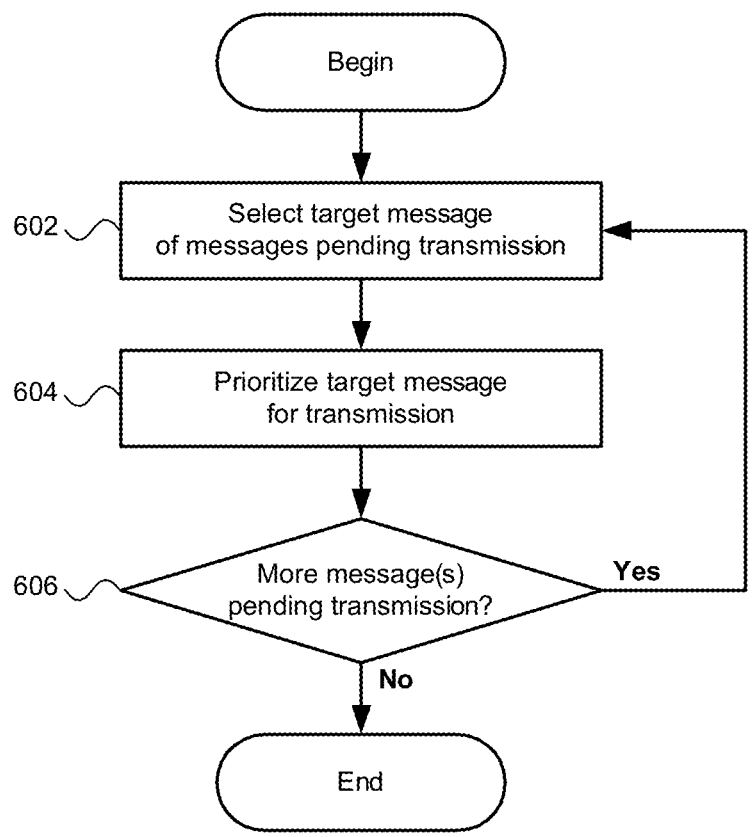
FIG. 6 demonstrates an example sequence of operations for ordering a plurality of messages awaiting transmission via a common message path segment between broker computers.

Turning now to FIG. 6, an example sequence of operations for ordering a plurality of messages awaiting transmission via a common message path segment between broker computers is demonstrated.

The sequence of operations shown in FIG. 6 may execute at a broker computer, such as the broker computer shown in FIG. 7 or any of the broker computers shown in FIG. 1. The broker computer may be included in a network of interconnected broker computers, such as the network of broker computers shown in FIG. 1. The broker computer may be the same broker computer at which the plurality of messages is awaiting transmission.

The common message path segment may be, or may represent, a network link or any other type of coupling connecting two or more broker computers included in the network of interconnected broker computers.

At selecting operation 602, a target message is selected from the plurality of messages pending transmission via the common message path segment between broker computers included in the network of interconnected broker computers such that the target message has a smallest latency budget among the plurality of messages. After selecting operation 602 is completed, control passes to prioritizing operation 604.

At prioritizing operation 604, the target message selected at selecting operation 602 is prioritized for transmission. It is emphasized that as a result, a topic with a smaller latency budget is assigned a higher priority. After prioritizing operation 604 is completed, control passes to determining operation 606.

At determining operation 606, it is determined whether one or more messages are awaiting transmission via the common message path segment. Determining operation 606 does not consider any message which has already been prioritized at prioritizing operation 604 but which has not yet been transmitted. If it is determined that one or more messages is awaiting transmission, control passes to selecting operation 602. Otherwise, the sequence of operations shown in FIG. 6 is complete.

The messages may be transmitted in the order in which the messages were prioritized at prioritizing operation 604. For example, the first message prioritized at prioritized at prioritizing operation 604 may be transmitted first. The priority may be enforced by a priority-based or laxity-based transmission scheduler.

Turning now to FIG. 7, an example broker computer 110 for transmitting data according to at least one quality of service requirement is illustrated.

The broker computer 110 is coupled to a network of interconnected broker computers for transmitting data according to at least one quality of service requirement 702. The network of interconnected broker computers may be as shown in FIG. 1.

The at least one quality of service requirement 702 may include a maximum probability of failure 704 to transmit the message.

The at least one quality of service requirement 702 may further include a maximum latency 706 for transmission of the message.

The broker computer 110 comprises a calculating unit 708. The calculating unit is configured to calculate a message path specifying a sequence of broker computers selected from the network of interconnected broker computers. The sequence commences with an initial broker computer connected to a sending computer. The sequence terminates with a final broker computer connected to a receiving computer. The message path is statistically estimated to fulfill the at least one quality of service requirement 702. To effect the foregoing, the calculating unit may be configured to perform calculating operation 302 in FIG. 3.

In the multi-path embodiment, the calculating unit 708 is further configured to calculate a plurality of message paths.

In an embodiment of the present invention, statistically estimating the probability of failure to transmit the message is based on a combined probability of failure to transmit the message by each of the broker computers in the message path.

In an embodiment of the present invention, statistically estimating the probability of failure to transmit the message is based on a probability of correlated failures.

In an embodiment of the present invention, statistically estimating the probability of failure to transmit the message is based on one or more models of probabilities of failure 710. The models of probabilities of failure may be known simply as failure models. The failure models may express the probability of independent failure of broker computers, networks and network links. The failure models may also express the probability of correlated failures.

A failure model 710 may be any of a wide variety of types of models. The models may include statistics which estimate the probability of independent failures, correlated failures or both.

The failure models may be built according to any of a wide variety of techniques. Failure probabilities can be learned from historical measurement. For example, a specific number of past measurement periods can be analyzed to determine the number of times a network link was down, the number of times a broker computer was down, and the like. Failure probabilities can also be learned from external sources of data and external failure models.

A failure model may be represented as a probability distribution over the broker computers, the message path segments, or both. In this case, the message path calculation can employ the model to estimate current probabilities of failure.

A failure model may, for example, be based on the frequency and magnitude of earthquakes across a geographical area, e.g., southern California.

Furthermore, any or all of the three preceding embodiments may be combined. Thus, statistically estimating the probability of failure to transmit the message may be based on a combination of the factors noted above.

In an embodiment of the present invention, the calculating unit 708 is further configured to select a set of one or more message paths such that the one or more message paths included in the set are statistically estimated to fulfill the maximum latency 706 for transmission of the message. The calculating unit is further configured to statistically estimate a probability of failure to transmit the message of each of the message paths in the set of one or more message paths. The calculating unit is further configured to, based on the statistically estimated probability of failure to transmit the message, select at least one candidate message path of the set of one or more message paths such that the at least one candidate message path is statistically estimated to fulfill the maximum probability of failure 704 to transmit the message. To effect the foregoing, the calculating unit may be configured to perform the sequence of operations shown in FIG. 5 or a subset thereof.

The broker computer 110 further comprises a budgeting unit 712. The budgeting unit is configured to calculate a latency budget for a message path calculated by the calculating unit 708. Calculating the latency budget comprises subtracting a statistically estimated latency of the message path from the maximum latency 706. The budgeting unit is further configured to distribute the latency budget among message path segments between broker computers specified by the message path. To effect the foregoing, the budgeting unit may be configured to perform calculating operation 304 and distributing operation 306 in FIG. 3.

The broker computer 110 further comprises a transmitting unit 714. The transmitting unit is configured to transmit a message from the initial broker computer to the receiving computer via the sequence of broker computers specified by a message path calculated by the calculating unit 708. To effect the foregoing, the transmitting unit may be configured to perform transmitting operation 312 in FIG. 3.

In the multi-path embodiment, the transmitting unit 714 is further configured to transmit the message according to each of the plurality of message paths calculated by the calculating unit 708.

The broker computer 110 further comprises a receiving unit 716. The receiving unit is configured to receive quality of service metrics about the network of interconnected broker computers. To effect the foregoing, the receiving unit may be configured to perform receiving operation 314 in FIG. 3.

The receiving unit 716 may be further configured to monitor the network of interconnected broker computers. To achieve this goal, the receiving unit may be further configured to perform the sequence of operations shown in FIG. 4 or a subset thereof.

In an embodiment of the present invention, receiving quality of service metrics about the network of interconnected broker computers includes monitoring a status of at least one of the broker computers included in the network of interconnected broker computers and at least one message path segment between broker computers included in the network of interconnected broker computers. Receiving quality of service metrics about the network of interconnected broker computers further includes determining at least one resiliency metric based on the monitored status. The quality of service metrics include the at least one resiliency metric.

In another embodiment of the present invention, receiving quality of service metrics about the network of interconnected broker computers includes monitoring a latency of at least one message path segment between broker computers included in the network of interconnected broker computers. Receiving quality of service metrics about the network of interconnected broker computers further includes determining at least one latency metric based on the monitored status. The quality of service metrics include the at least one latency metric.

Furthermore, the two preceding embodiments may be combined. In this case, the quality of service metrics include both the at least one resiliency metric and the at least one latency metric.

The broker computer 110 further comprises a determining unit 718. The determining unit is configured to determine whether a message path calculated by the calculating unit 708 fulfills the at least one quality of service requirement 702 based on the quality of service metrics received by the receiving unit 714. The determining unit is further configured to cause the calculating unit 708 to calculate a new message path specifying a new sequence of broker computers selected from the network of interconnected broker computers if the message path is determined not to fulfill the at least one quality of service requirement. The new message path is statistically estimated to fulfill the at least one quality of service requirement. To effect the foregoing, the determining unit may be configured to perform determining operation 316 in FIG. 3.

In the multi-path embodiment, the determining unit 718 is further configured to determine whether the plurality of message paths calculated by the calculating unit 708 collectively fulfill the at least one quality of service requirement 702. The determining unit is further configured to cause the calculating unit to calculate a new plurality of message paths if the calculated plurality of message paths is determined not to collectively fulfill the at least one quality of service requirement.

The broker computer 110 further comprises a prioritizing unit 720. The prioritizing unit is configured to select a target message from a plurality of messages pending transmission via a common message path segment between broker computers included in the network of interconnected broker computers such that the target message has a smallest latency budget among the plurality of messages. The prioritizing unit is further configured to prioritize the target message for transmission. To effect the foregoing, the prioritizing unit may be configured to perform the sequence of operations shown in FIG. 6.

The broker computer 110 further comprises a configuration unit 722. The configuration unit is configured to configure the broker computer in which it is included. The configuration unit may be a software program or computer program product or a subset thereof. The configuration unit may be configured to accept user input to allow a user or administrator to control and specify the configuration of the broker computer, including any of the parameters and rules described below.

The configuration unit 722 may be configured to determine the other broker computers in the network of interconnected broker computers to which this broker computer 110 is connected. Thus, the configuration unit may be configured to control the network topology as it relates to this broker computer.

The network topology between broker computers, including the selection of which broker computers are directly connected to which other broker computers, may be determined according to any of a wide variety of methods and factors. Such factors may include network quality between broker computers. Network quality may include physical proximity between broker computers. Thus, broker computers may be directly connected to those broker computers which are relatively nearly positioned.

Such factors may also include security policies and administrative policies. Specifically, rules may specify minimum security requirements for broker computers to which this broker computer may be directly connected. Trust relationships between broker computers may be specified, with connections only being created between two broker computers between which such a trust relationship exists.

The configuration unit 722 may be further configured to configure the parameter specifying the number of message paths for multi-path routing as described above. This parameter may be received as user input.

Figure 8:
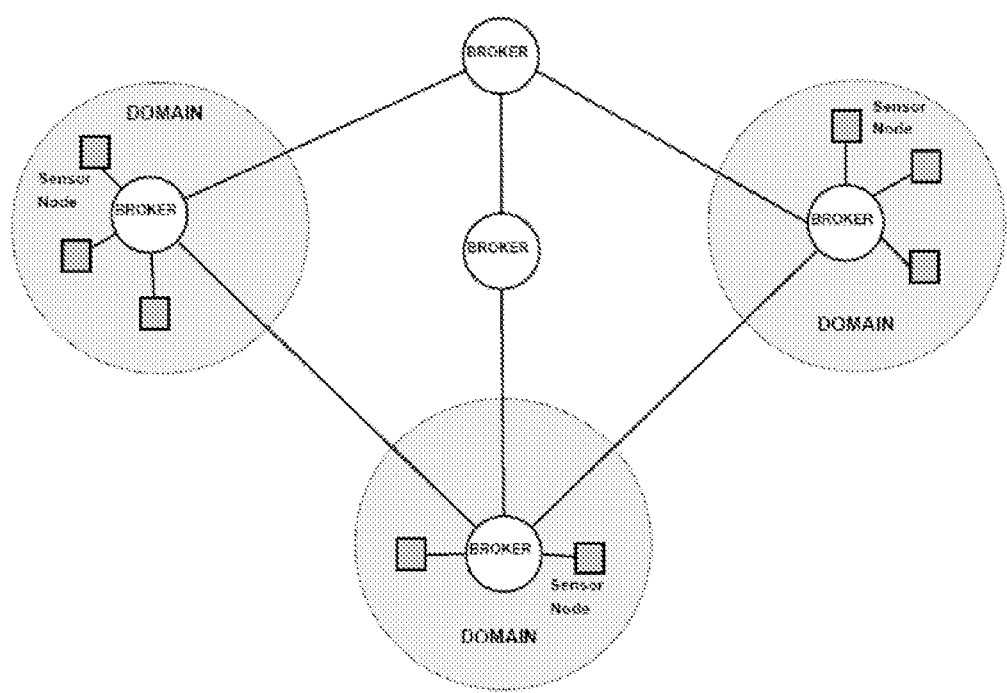
FIG. 8 illustrates a network model for an embodiment of the present invention.

Turning now to FIG. 8, a network model for an embodiment of the present invention is illustrated. The embodiment is a message-oriented middleware that provides end-to-end QoS assurance in wide-area publish/subscribe communication.

The embodiment is an overlay-based messaging system that can manage the end-to-end QoS, in terms of latency, throughput and availability, in the pub/sub communications based on the application requirements. This is achieved through a holistic set of overlay route establishment and maintenance mechanisms, which actively exploit the diversity in the network paths and redirect the traffic over links with good quality, e.g., low latency and high availability. In order to cope with network dynamics and failures, the embodiment continuously monitors the link quality and adapts the routes whenever their quality deteriorates below the application requirements. The embodiment also leverages the resource scheduling capabilities in the underlying data transport layer, and utilizes a novel budget assignment scheme to control its scheduling behavior. We have fully implemented the embodiment and evaluated its performance on a real testbed. Our experimental results have confirmed that the embodiment can effectively provide end-to-end QoS over wide-area networks despite the fact that the underlying networks only provide best-efforts connectivity and are inherently dynamic.

We are witnessing major transformations to the enterprise computing landscape. One of such transformations is the ever increasing awareness of the real-world events and conditions through massive sensing, analytics and control capabilities, leading to a proliferation of cyber-physical systems (CPS). Another major transformation is the growing interconnection and interoperation of enterprise systems over a geographically distributed wide area, as triggered by business practices like mergers and acquisitions, off-shoring, outsourcing, and the formation of virtual enterprises. The second transformation has been driving an emerging engineering discipline around the system of systems (SoS). CPS and SoS have introduced new non-functional requirements on message-oriented middleware (MOM). Specifically, MOM must be aware of and satisfy the unique quality-of-service (QoS) needs of these new systems in order for it to be practically useful.

Consider cyber physical systems being developed for a wide variety of application domains ranging from the smart grid of electricity to environmental monitoring and to intelligent transportation. Voluminous sensor event data needs to be transported from field sensors to backend enterprise servers for complex event processing and integration with the business processes. Sensor data is often time-sensitive in that the correct data that comes too late may become the wrong data. Therefore sensor data must be transported in a very responsive and reliable manner. Similarly, control directives carried in the reverse direction of traffic may drive various mission-critical systems. The control directives may have stringent requirements on delivery performance and security in order to avoid catastrophic consequences. On the other hand, the communication infrastructure for sensor data and control directives presents a number of challenges. Sensors are often deployed in potentially hostile environments, which make the sensors more prone to malicious attacks and natural hazards. Further, sensors are connected through wireless links that are inherently weak. There may be a high degree of variability in wireless bandwidth due to moving obstructions, RF interference, and weather. There may also be periods of intermittent disconnections. Such characteristics make it very difficult for MOM to effectively address the QoS requirements of CPS.

In the realm of system of systems, the constituent systems may be distributed over a large geographic area, e.g., across a nation or even spanning multiple continents. Messages between the systems often have to travel a long communication path, incurring much larger delay than local-area messaging. It is also harder for a long-haul communication path to maintain high availability due to the increased number of nodes and links on the path. Further, the systems are likely to be deployed and operated by separate organizations, which result in different security properties and degrees of trustworthiness to be associated with these systems. Despite technical challenges arising out of the communication infrastructure, many SoS applications require messaging capabilities with certain assurance on a range of QoS metrics including latency, throughput, availability and security.

The embodiment is designed to combine the best of enterprising messaging and real-time messaging to suit the needs of the emerging CPS and SoS paradigms. Specifically, the embodiment facilitates the interconnection of disparate messaging domains over large geographic areas and heterogeneous network infrastructure, and provides compatibility and interoperability with de-facto messaging standards including both the Java™ Message Service (JMS) standard and the Data-Distribution Service for Real-Time Systems™ (DDS™) standard. Data-Distribution Service for Real-Time Systems and DDS are either registered trademarks or trademarks of Object Management Group, Inc. in the United States and/or other countries. One salient feature of the embodiment is the holistic provisioning of dependable and predictable QoS by effectively addressing system and network dynamics, heterogeneity and failure conditions. It allows the specification of required performance properties (i.e., latency and throughput), availability and reliability models, and security constraints separately for each message topic or connection session; it further transports messages across autonomously administered domains respecting the above requirements end-to-end.

We focus on the provisioning of end-to-end latency QoS in the embodiment in the context of MoM for wide-area federated domains. This is achieved through an integrated approach that combines overlay routing and message scheduling techniques for managing network latency and processing latency respectively. In particular, the overlay routing mechanisms actively exploit diversity in the network paths and redirect messages over those links with good quality, e.g., low latency and high availability. In order to cope with network dynamics and failures, the embodiment continuously monitors the link quality and adapts the routes whenever their quality deteriorates below the application requirements. The embodiment also leverages the resource scheduling capabilities in the data transport layer, and employs a novel budget allocation scheme to adapt to short-term network dynamics. Our experiment results demonstrate that the embodiment can effectively manage the end-to-end latency with respect to the application requirements despite the dynamics in the wide-area networks.

Our work targets emerging intelligent systems that embed the cyber-infrastructure in the physical world with massive sensing, processing and control capabilities. Examples of such systems include Smart Grid for electricity distribution, smart city management and intelligent transportation. In all these applications, a large number of sensors and actuators are deployed in the field, and they must be interconnected with the event processing and analytics capabilities at the back end. A wide variety of event data and control directives are transported across different nodes in real time. This requires a messaging service that supports different communication paradigms, such as point-to-point, multicast and publish/subscribe. While the system we developed supports all these communication paradigms, we focus on the publish/subscribe aspect, because it is the fundamental mechanism for asynchronous communication in distributed systems.

We assume that the sensor nodes can be clustered into many local domains, and there is one broker node inside each domain. These brokers are inter-connected through an overlay network and collectively provide the publish/subscribe messaging service. Each endpoint node, such as a sensor, an actuator or a processing element, is attached to the local broker. There can be an arbitrary number of topics in the system, which can be defined either through administrative tools or dynamically using programming APIs. Each endpoint can publish and subscribe to one or multiple topics, while each broker can perform publish/subscribe matching, transport messages to local endpoints or neighboring brokers, and optionally perform message mediation (e.g., format transformation). Compared to the traditional approach using a single broker or a cluster of brokers, our overlay-based approach provides several architectural benefits as follows:

Scalability: Each node only needs to know the local broker, while each broker only communicates with a small number of neighboring brokers. As such, we can avoid maintaining pair-wise connections, which is prohibitively expensive as the system scales up.

Federation: The system is likely deployed and operated jointly by multiple organizations. In such a federated scenario, it is critical that each administrative domain can independently manage the access from/to its own nodes, which can be easily facilitated by the local brokers.

Heterogeneity: The sensors are inevitably heterogeneous in a large-scale system. It is difficult, if possible, for any broker to understand all the protocols used by different nodes. With an overlay, the brokers can agree on a canonical protocol among themselves, and use a few adapters to communicate with the local sensor nodes.

Within each local domain, the sensor and actuator nodes can be connected to the broker through a variety of forms, e.g., wireless sensor networks. We focus on providing Quality-of-Service (QoS) assurance within the broker overlay network.

Providing predictable Quality-of-Service (QoS) is an essential requirement for mission-critical applications. In particular, the messaging service must be able to ensure timely and reliable delivery of critical messages, such as an emergency alert or a real-time control command. Formally stated, our goal is to provide QoS-aware publish/subscribe service in terms of message latency and delivery rate between all matching pairs of publishers and subscribers. Specifically, each topic is associated with a maximum delay that its messages can tolerate, and our system seeks to maximize the in-time message delivery rate, i.e., the percentage of messages that arrive before their respective deadline. We consider per-topic latency requirement for ease of presentation. Our system can be easily extended to provide different QoS for individual publishers and subscribers.

Note that the end-to-end delay for a given message consists of both processing delay at each intermediate broker and the communication delay between adjacent brokers. The former is affected by the load (i.e., message arrival process) of a broker, while the latter is affected by the characteristics of the network links. The broker processing delay also varies over time as each broker dispatches messages on multiple topics, and the messages may arrive in burst. Furthermore, since the sensors and actuators are deployed over a large geographic area, they will inevitably operate over wide-area networks, where the link quality fluctuates due to the dynamic traffic load. While some applications may employ dedicated networks, in general we do not assume the underlying network provides any QoS assurance. Such a relaxed network model allows our system to be applicable in different deployment scenarios, but it also poses challenges to our design as the messaging service must cope with such network and system dynamics, and ensure the end-to-end latency requirement is continuously satisfied.

Figure 9:
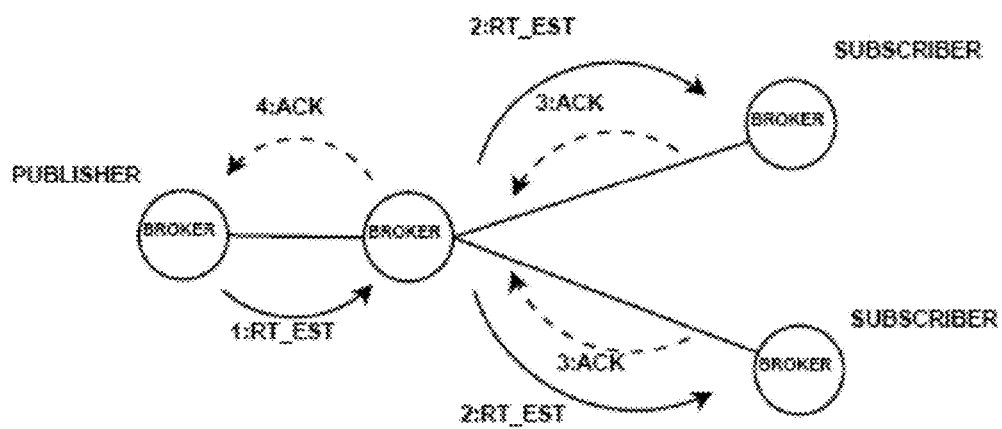
FIG. 9 demonstrates an example of route establishment within the embodiment.

Turning now to FIG. 9, an example of route establishment within the embodiment is demonstrated. It is noted that in FIG. 9, numbers indicate the sequence of an operation.

We use two basic techniques to meet the end-to-end latency requirement: 1) use overlay routing to bypass a congested network link or an overloaded broker, 2) schedule the transmission of different messages at each broker according to their deadlines. However, in a publish/subscribe system where each topic may have many widely distributed publishers and subscribers, there are a few non-trivial challenges. First, how to locate all publishers and subscribers of a given topic in a distributed manner, and how to establish and adapt overlay routes among brokers in response to network dynamics such as congested or failed links and brokers? Second, how can we coordinate the scheduling decisions at brokers along a route to achieve the end-to-end latency?

To address these challenges, we take an integrated QoS approach that combines overlay routing and message scheduling, which take care of the two components in end-to-end delay, namely network latency and processing latency. To deliver messages, the brokers first exchange control messages to locate other brokers that have subscribers for topics on which they publish. Each broker also employs a monitoring agent that keeps track of its processing latency and network latency to neighboring brokers. These measurement messages are exchanged among brokers to find overlay routes that satisfy end-to-end delay requirements.

To adapt to near-term or medium magnitude latency changes, we use a latency budget allocation technique that specifies the allowed latency budget at each hop, including both processing and network latencies. The broker schedules message transmissions such that each message is delivered to the next hop broker within that latency budget. When the processing or network latencies increase at one broker, the system can reduce some budget at other brokers and increase the budget at this broker, such that the end-to-end delay is still satisfied. However, when the changes in latency go beyond what can be handled by shifting the budget, new routing paths are computed to avoid congested links or overloaded brokers.

For simplicity, we assume that the broker overlay topology is relatively stable. Brokers maintain long-lived links among themselves. These brokers and links may fail, but in general brokers do not join or leave the overlay frequently. This assumption is reasonable in many application scenarios because the broker deployment only changes at very coarse timescales (e.g., once in a few weeks). In cases where brokers do frequently join and leave, a topology maintenance scheme is needed to adjust network topology. We leave this issue for future study.

In general, there are two approaches for routing, namely link state (e.g., OSPF, such as OSPF Version 2 as defined by RFC 2328) and distance vector (e.g., RIP, such as RIP Version 2 as defined by RFC 2453). While each approach has its own merits, our design follows link state which is more suitable for our specific context, which we will explain later. We also employ several techniques to support QoS in distributed publish/subscribe communication.

Each endpoint can subscribe to any topic at any time. Such subscriptions are sent to the local broker which this endpoint is attached to. Each broker maintains a local subscription table to record which topics each local endpoint subscribes to. The brokers then propagate these topics to other brokers. As a result, each broker knows which topics any other broker needs; it maintains such information in a remote subscription table.

When an endpoint publishes a message on a topic, say T, the message is sent to the local broker. This broker first checks the local subscription table and transmits to all local subscribers of T. It also checks the remote subscription table to finds all remote brokers that subscribe to T, and sends the message to these brokers using the overlay routes. Upon receiving this message, these brokers further forward it to their respective local subscribers. As such, the message will eventually arrive at all subscribers of topic T in the system.

The brokers periodically advertise the link states, including the measured processing latency for each topic, and the network latency to each of its neighbors. Such latency measurements are propagated to all other brokers through a simple neighbor forwarding mechanism. Thus each broker has a local copy of the network map, i.e., the topology with latency measurements for all nodes and links.

A broker also employs a monitoring agent to measure processing and network latencies. It periodically pings neighboring brokers to obtain network latency. We use Exponentially Weighted Moving Averaging (EWMA) to avoid sudden spikes and drops in the measurements. On the other hand, if a neighbor fails to reply to three consecutive ping messages, it is considered to have failed and the link latency is marked as ∞. The monitoring agent also keeps track of the broker processing latency. Both delay measurements are included in the link state advertisement so that each broker can build a complete network map.

In OSPF, each node independently runs Dijkstra's algorithm over the network map to determine the shortest path to every other node, and then populates its routing table accordingly. We do not directly apply this method in our broker overlay due to the need to control the latency budget for QoS. Because each node on a route makes independent and possibly different decisions on how to reach the destination, the end-to-end routes change frequently; no single node can control the route. This makes it very difficult to apply the budget allocation technique on a hop-by-hop basis.

Instead, we employ a novel source routing scheme, where a publisher broker locally computes the routes to all destinations (i.e., matching subscribers), and uses a signaling protocol to set up these routes. Specifically, the source node sends a route establishment (RT_EST) message to its next-hop neighbor on a route. The RT_EST message contains the topic name and all intermediate brokers on the route.

Upon receiving this message, a broker first checks whether it is the destination on the route. If so, it sends an acknowledgment to the upstream node from which it receives this message. Otherwise, it extracts its own next hops from the routes and forwards this RT_EST message to its next hop broker. When a node receives an acknowledgment from its downstream broker, it inserts the <topic,next_hop> pairs into its routing table, and then acknowledges to its own upstream node. This way, finally the source node receives the acknowledgment and the path is established, as shown in FIG. 9.

We further improve the resiliency of constructed paths by allowing applications to request the construction of multiple concurrent paths to each destination. The publisher broker first computes multiple paths, ordered on their respective delays and starting from the one with the smallest delay. The first one is chosen, then each subsequent path is compared with all previous chosen paths to see whether it is disjoint to all of them. Only one that is disjoint is chosen as the next path.

This way, we can find multiple disjoint paths to improve both resiliency and end-to-end delay. This is similar to k-shortest path algorithms.

To briefly summarize, our scheme differs from OSPF in two fundamental aspects: 1) In OSPF, each node independently decides its next-hop nodes. In our scheme, the source node decides the entire routes. 2) In OSPF, a new link state advertisement may trigger an intermediate node to update its routing table, thus changing the end-to-end routes. In our scheme, once the routes are established, they remain fixed until the source node tears them down. To adapt to network dynamics, we employ a QoS-driven route maintenance mechanism.

The embodiment updates the overlay routes only when they cannot meet the latency requirement. This could happen when the route is disrupted by broker failure or network outage, or when the route quality deteriorates as the brokers are overloaded or the network is congested. All these cases can be easily detected by a source node, because it receives link state advertisement from all other brokers (assuming the overlay is not partitioned by the failures). Specifically, when a source node receives a link state update, it checks whether the reported latency affects any of its routes. If so, it updates the end-to-end latency of the current routes and compares it to the latency requirement. If the requirement is still satisfied, no action is taken. Otherwise, it re-computes a new set of routes and establishes them using the signaling protocol as described above.

When routes need to be updated, a task similar to the route establishment is performed, with the difference that routing tables are updated incrementally. In particular, the source compute the delta-path between the previous and current paths and sends out a route establishment (RT_EST) message that contains the list of new links as well as the list of obsolete links. Upon reception, a node will perform a similar operation as above, i.e. forward (RT_EST) to current and new downstream nodes but only wait for replies from its new downstream nodes. As soon as acknowledgments are received, the routing table is updated with the new downstream destinations and cleared of its removed links. This technique ensures that no flow will be interrupted while the update process is executed.

Message scheduling is another important QoS mechanism we employ. It complements the overlay routing by proactively managing the network resources along the established routes.

Although each broker can run a scheduler to manage its local queues, that does not always lead to globally optimal results. The multiple brokers a message traverses may each dispatch messages independently from each other, which do not necessarily achieve the end-to-end delay requirement. Although one centralized algorithm can collect the queue behavior (e.g., arrival process, steady states) of all brokers and make decisions, such information changes fast and is difficult to maintain.

We apply a heuristics algorithm where the latency margin, the difference between the delay requirement and the current end-to-end delay, is divided among all brokers. Each broker will have some "buffer" to absorb sudden latency increases, provided they are small enough compared to the margin.

Consider a broker B which is currently on the forwarding routes for a set of topics $T_1, T_2, \ldots, T_I$. Let $D_i$ be the end-to-end latency requirement for topic $T_i$. The route for topic $T_i$ has $K_i$ hops, and the measured latency at each hop is $d_i^j$, where $1 \leq j \leq K_i$.

Our intuition is to give higher priority to those topics whose end-to-end latency is approaching the bound. To do so, we calculate the end-to-end latency margin for each topic (say $T_i$) as:

$$L_i = D_i - \sum_{j=1}^{K_i} d_i^j$$

We equally split this end-to-end latency margin among the $K_i$ hops in the route. Thus the per-hop latency margin for topic $T_i$ is:

$$L_i^j = \left(D_i - \sum_{j=1}^{K_i} d_i^j\right) / K_i$$

Now the broker B can sort the topics in an increasing order of their per-hop latency margin. That is, the first topic has the smallest margin, thus should have the highest priority. Since laxity-based scheduling is used by the transmission queue, a high priority can be enforced by assigning a small latency budget for this topic. In general, for the n-th topic in the sorted list, we can assign a latency budget as (where δ is a step parameter):

$$LB_n = \min_{1 \leq i \leq I} T_i + n \times \delta$$

We need to point out that the equal splitting among brokers is one simplest form of budget allocation. It allows coordinated scheduling behavior across brokers, such that messages close to their delay bound get preferential treatment. We leave the differentiated split of the margin among brokers as future work.

Figure 10:
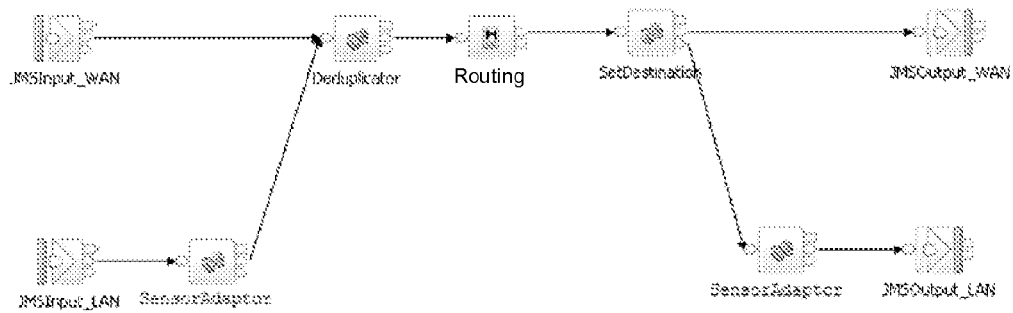
FIG. 10 illustrates an implementation of the WMB flow at each overlay broker in the embodiment.

Turning now to FIG. 10, an implementation of the WMB flow at each overlay broker in the embodiment is illustrated.

We have implemented our system within the IBM WebSphere® Message Broker (WMB) development platform. WebSphere is a registered trademark of International Business Machines Corporation, Armonk, N.Y., United States, in the United States, other countries, or both. WMB introduces the concepts of message flows; a message flow comprises of one or more incoming connections, a message processing component and one or more outgoing connections. Incoming connections are used by local domain applications to access the embodiment. Our implementation significantly simplifies the process of accessing the messaging service for the local domain applications by utilizing the Java Messaging Service (JMS) API. Thus, applications that already access a messaging service via JMS can readily switch to messaging according to the embodiment, while for legacy applications, JMS transformers can be easily built. Finally, incoming and outgoing connections are also established to interconnect brokers across the wide area network.

The control mechanism of the embodiment sits between the incoming and the outgoing connections, handling the process of routing the various messages to the appropriate outgoing connections. In this way, WMB acts as the integrating agent between the routing control layer of the embodiment and the data transport layer. Therefore, the routing control layer of the embodiment remains decoupled from any specific transport.

As discussed above, the embodiment utilizes the JMS publish/subscribe messaging API. To facilitate message forwarding, the embodiment defines a different topic name space and naming convention to make a clear distinction between (i) topics coming from and destined for the local domain applications and (ii) topics coming from and destined for the WAN overlay brokers. The embodiment will then handle the topic name transformation from local domain to WAN overlay. More precisely, in the local domain a global topic name T is transformed into the form /src/T when forwarded to the embodiment and /dst/T when sent out from the embodiment. At the WAN overlay, topic T will be transformed according to the destination as /destID/T. This novel forwarding approach significantly simplifies the routing process by directly leveraging the underlying publish/subscribe infrastructure removing the requirement for a separate forwarding protocol. Furthermore, it can be readily used among different publish/subscribe engines beyond the JMS implementation of the embodiment.

The overall design is illustrated in FIG. 10 where the actual WMB flow components of the embodiment are shown. Two JMS input components are seen, one subscribing to local domain topics application publications (JMSInput_LAN) and one for incoming messages from remote brokers (JMSInput_WAN). Messages topics from the LAN are transformed via the Sensor Adapter component to internal names as assigned by the embodiment. Then, these messages along with incoming wide area messages are forwarded to the routing component which maintains the per-topic routing destinations. A de-duplication component removes possible duplicate messages received at the local node which could occur in the case of multipath routing. Finally, similar to the incoming messages, JMS output components are used for publishing out local domain (JMSOutput_LAN) and wide area messages (JMSOutput_WAN) according to destinations provided by the routing component of the embodiment.

Figure 11:
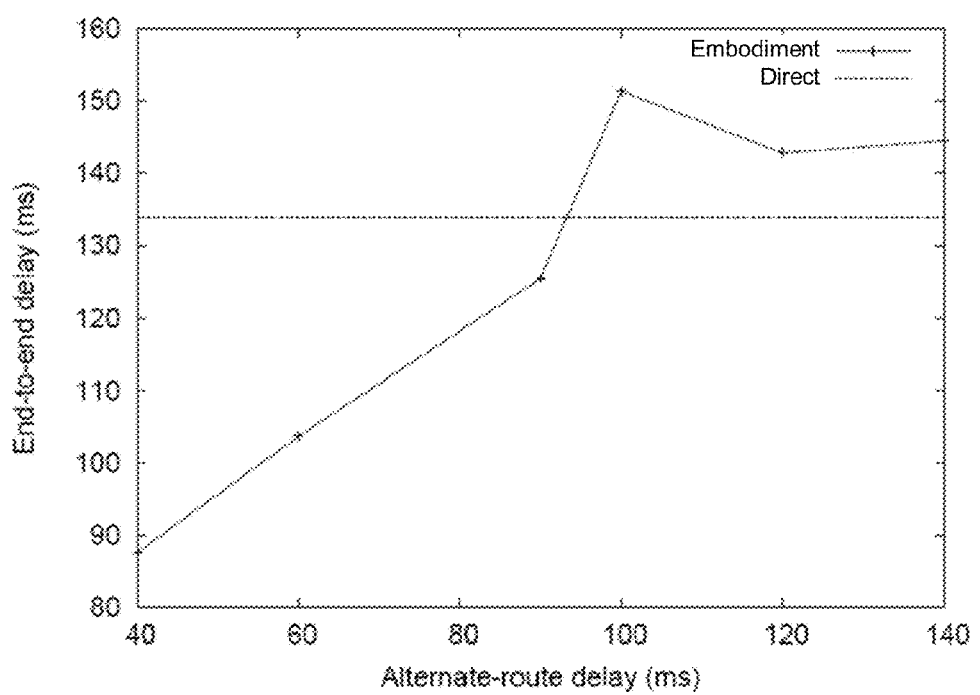
FIG. 11 shows a chart of the end-to-end delay for both the embodiment and direct linking.

Turning now to FIG. 11, a chart of the end-to-end delay for both the embodiment and direct linking is shown.

To understand the performance of our system, we use IBM Research Cloud and report some preliminary results for our system. We instantiated 20 Linux VMs to form the overlay for the embodiment. To reflect wide-area network delays, we used the AT&T measurements to set the network delay on each overlay link. Each node has its corresponding location. The 20 nodes are distributed throughout the United States of America.

As the initial experiment, we compare the end-to-end delay between two broker nodes when (i) they use a direct link and (ii) using the embodiment for QoS routing. We set up the publisher application at node 9 (located in L.A.) and the subscriber application at node 19 (in Seattle). We first measure the end-to-end message delivery delay along the direct link, which has a mean delay of 100 ms and a variance of 10 ms. We let the publisher send 10 messages per second and average the end-to-end delay over multiple runs. Then we use routing provided by the embodiment and repeat the same experiments. To study how the embodiment performs against different network delays in alternate paths, we vary the network latency on the alternative path from 40 ms to 140 ms in steps of 20 ms, with 10% variance. This simulates cases where alternate paths have smaller and larger delays.

FIG. 11 shows the end-to-end comparison as the delay on the alternative path changes. Initially the alternative path has smaller delay. Since the embodiment can leverage paths with shorter delay and delivers messages earlier, the end-to-end delay is smaller than that of the direct link. As the delay over the alternative path increases, gradually the end-to-end delay of the embodiment grows. When the delay on the alternative path exceeds that of the direct link, the end-to-end delay of the embodiment becomes slightly larger. And it becomes flat as the delay on the alternate path continues to increase. This is because in such cases the embodiment uses the direct link for delivery. Thus even without better alternative paths, the embodiment achieves similar performance to that of the direct link.

We have presented the design and implementation of an embodiment providing a QoS-Aware and resilient messaging system. The embodiment constructs an overlay network on top of the physical topology and provides a novel fusion of routing, scheduling and delay budget allocation to maintain the QoS requirements of event-driven applications. The embodiment allows for path adaptation and reconfigurations when either network outages or excessive delays occur along a delivery path. We have fully implemented the embodiment, deployed a prototype in a large scale network and verified the feasibility and advantages of our approach.

Currently we are looking into several improvements and extensions to the embodiment. We are extending our path computation algorithms to accommodate multiple QoS dimensions in parallel. In addition we plan, in our future work, to support dynamic topology construction and adaptation as nodes join and leave the overlay in order to optimize the available connectivity to improve the output of the path computation and the resiliency level. Finally, we plan to integrate mediation functionality in the embodiment to allow applications to perform various types of action on messages such as transformations and filtering.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention. Furthermore, the use of the terms a, an, etc. do not denote a limitation of quantity, but rather denote the presence of at least one of the referenced item.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for transmitting data according to at least one quality of service requirement for a message topic, the method comprising:
    calculating a message path specifying a sequence of broker computers selected from a network of interconnected broker computers, the sequence of broker computers including publisher brokers publishing messages with the message topic and subscriber brokers receiving messages with the message topic, the sequence commencing with an initial broker computer connected to a sending computer, the sequence terminating with a final broker computer connected to a receiving computer, the message path being statistically estimated to fulfill the at least one quality of service requirement for the message topic;
    transmitting a message from the initial broker computer to the receiving computer via the sequence of broker computers specified by the message path, the message including the message topic as metadata;
    receiving quality of service metrics about the network of interconnected broker computers;
    determining whether the message path fulfills the at least one quality of service requirement based on the quality of service metrics; and
    if the message path is determined not to fulfill the at least one quality of service requirement, repeating the calculating step for a new message path specifying a new sequence of broker computers selected from the network of interconnected broker computers, the new message path being statistically estimated to fulfill the at least one quality of service requirement for the message topic.

2. The method of claim 1, wherein the at least one quality of service requirement includes a maximum probability of failure to transmit the message.

3. The method of claim 2, wherein:
    the at least one quality of service requirement includes a maximum latency for transmission of the message; and
    the calculating step comprises:

selecting a set of one or more message paths such that the one or more message paths included in the set are statistically estimated to fulfill the maximum latency for transmission of the message, statistically estimating a probability of failure to transmit the message of each of the message paths in the set of one or more message paths, and based on the statistically estimated probability of failure to transmit the message, selecting at least one candidate message path of the set of one or more message paths such that the at least one candidate message path is statistically estimated to fulfill the maximum probability of failure to transmit the message.

4. The method of claim 3, wherein statistically estimating the probability of failure to transmit the message is based on a combined probability of failure to transmit the message by each of the broker computers in the message path.

5. The method of claim 3, wherein statistically estimating the probability of failure to transmit the message is based on at least one of a probability of correlated failures and a model of probabilities of failure.

6. The method of claim 1, wherein the at least one quality of service requirement includes a maximum latency for transmission of the message.

7. The method of claim 6, further comprising:

calculating a latency budget, wherein calculating the latency budget comprises subtracting a statistically estimated latency of the message path from the maximum latency; and distributing the latency budget among message path segments between broker computers specified by the message path.

8. The method of claim 7, further comprising:

selecting a target message from a plurality of messages pending transmission via a common message path segment between broker computers included in the network of interconnected broker computers such that the target message has a smallest latency budget among the plurality of messages; and prioritizing the target message for transmission.

9. The method of claim 1, wherein:

the calculating step calculates a plurality of message paths;

the transmitting step transmits the message according to each of the calculated plurality of message paths;

the determining step determines whether the calculated plurality of message paths collectively fulfill the at least one quality of service requirement; and repeating the calculating step if the calculated plurality of message paths is determined not to collectively fulfill the at least one quality of service requirement.

10. The method of claim 1, wherein:

receiving quality of service metrics about the network of interconnected broker computers includes:

monitoring a status of at least one of the broker computers included in the network of interconnected broker computers and at least one message path segment between broker computers included in the network of interconnected broker computers, and determining at least one resiliency metric based on the monitored status; and the quality of service metrics include the at least one resiliency metric.

11. The method of claim 1, wherein:

receiving quality of service metrics about the network of interconnected broker computers includes:

monitoring a latency of at least one message path segment between broker computers included in the network of interconnected broker computers, and determining at least one latency metric based on the monitored status; and the quality of service metrics include the at least one latency metric.

12. A broker computer coupled to a network of interconnected broker computers for transmitting data according to at least one quality of service requirement for a message topic, the broker computer comprising:

a calculating unit configured to calculate a message path specifying a sequence of broker computers selected from the network of interconnected broker computers, the sequence of broker computers including publisher brokers publishing messages with the message topic and subscriber brokers receiving messages with the message topic, the sequence commencing with an initial broker computer connected to a sending computer, the sequence terminating with a final broker computer connected to a receiving computer, the message path being statistically estimated to fulfill the at least one quality of service requirement for the message topic;

a transmitting unit configured to transmit a message from the initial broker computer to the receiving computer via the sequence of broker computers specified by the message path, the message including the message topic as metadata;

a receiving unit configured to receive quality of service metrics about the network of interconnected broker computers; and a determining unit configured to determine whether the message path fulfills the at least one quality of service requirement based on the quality of service metrics and, if the message path is determined not to fulfill the at least one quality of service requirement, to cause the calculating unit to calculate a new message path specifying a new sequence of broker computers selected from the network of interconnected broker computers, the new message path being statistically estimated to fulfill the at least one quality of service requirement for the message topic.

13. The broker computer of claim 12, wherein the at least one quality of service requirement includes a maximum probability of failure to transmit the message.

14. The broker computer of claim 13, wherein:

the at least one quality of service requirement includes a maximum latency for transmission of the message; and the calculating unit is further configured to:

select a set of one or more message paths such that the one or more message paths included in the set are statistically estimated to fulfill the maximum latency for transmission of the message, statistically estimate a probability of failure to transmit the message of each of the message paths in the set of one or more message paths, and based on the statistically estimated probability of failure to transmit the message, select at least one candidate message path of the set of one or more message paths such that the at least one candidate message path is statistically estimated to fulfill the maximum probability of failure to transmit the message.

15. The broker computer of claim 14, wherein statistically estimating the probability of failure to transmit the message is based on a combined probability of failure to transmit the message by each of the broker computers in the message path.

16. The broker computer of claim 14, wherein statistically estimating the probability of failure to transmit the message is based on at least one of a probability of correlated failures and a model of probabilities of failure.

17. The broker computer of claim 12, wherein the at least one quality of service requirement includes a maximum latency for transmission of the message.

18. The broker computer of claim 17, further comprising a budgeting unit configured to:
calculate a latency budget, wherein calculating the latency budget comprises subtracting a statistically estimated latency of the message path from the maximum latency; and
distribute the latency budget among message path segments between broker computers specified by the message path.

19. The broker computer of claim 18, further comprising a prioritizing unit configured to:
select a target message from a plurality of messages pending transmission via a common message path segment between broker computers included in the network of interconnected broker computers such that the target message has a smallest latency budget among the plurality of messages; and
prioritize the target message for transmission.

20. The broker computer of claim 12, wherein:
the calculating unit is further configured to calculate a plurality of message paths;
the transmitting unit is further configured to transmit the message according to each of the calculated plurality of message paths; and
the determining unit is further configured to determine whether the calculated plurality of message paths collectively fulfill the at least one quality of service requirement and, if the calculated plurality of message paths is determined not to collectively fulfill the at least one quality of service requirement, to cause the calculating unit to calculate a new plurality of message paths.

21. The broker computer of claim 12, wherein:
receiving quality of service metrics about the network of interconnected broker computers includes:
monitoring a status of at least one of the broker computers included in the network of interconnected broker computers and at least one message path segment between broker computers included in the network of interconnected broker computers, and
determining at least one resiliency metric based on the monitored status; and
the quality of service metrics include the at least one resiliency metric.

22. The broker computer of claim 12, wherein:
receiving quality of service metrics about the network of interconnected broker computers includes:
monitoring a latency of at least one message path segment between broker computers included in the network of interconnected broker computers, and
determining at least one latency metric based on the monitored status; and
the quality of service metrics include the at least one latency metric.

23. A computer program product for transmitting data according to at least one quality of service requirement, the computer program product comprising:
a non-transitory computer readable storage medium having computer readable program code embodied therewith, the computer readable program code configured to:
calculate a message path specifying a sequence of broker computers selected from a network of interconnected broker computers, the sequence of broker computers including publisher brokers publishing messages with the message topic and subscriber brokers receiving messages with the message topic, the sequence commencing with an initial broker computer connected to a sending computer, the sequence terminating with a final broker computer connected to a receiving computer, the message path being statistically estimated to fulfill the at least one quality of service requirement for the message topic;
transmit a message from the initial broker computer to the receiving computer via the sequence of broker computers specified by the message path, the message including the message topic as metadata;
receive quality of service metrics about the network of interconnected broker computers;
determine whether the message path fulfills the at least one quality of service requirement based on the quality of service metrics; and
if the message path is determined not to fulfill the at least one quality of service requirement, execute the calculate program code for a new message path specifying a new sequence of broker computers selected from the network of interconnected broker computers, the new message path being statistically estimated to fulfill the at least one quality of service requirement for the message topic.

24. The computer program product of claim 23, wherein the at least one quality of service requirement includes a maximum probability of failure to transmit the message.

25. The computer program product of claim 24, wherein:
the at least one quality of service requirement includes a maximum latency for transmission of the message; and
the calculate program code is further configured to:
select a set of one or more message paths such that the one or more message paths included in the set are statistically estimated to fulfill the maximum latency for transmission of the message,
statistically estimate a probability of failure to transmit the message of each of the message paths in the set of one or more message paths, and
based on the statistically estimated probability of failure to transmit the message, select at least one candidate message path of the set of one or more message paths such that the at least one candidate message path is statistically estimated to fulfill the maximum probability of failure to transmit the message.

* * * * *